(12) United States Patent
Katagiri et al.

(10) Patent No.: US 10,332,652 B2
(45) Date of Patent: Jun. 25, 2019

(54) CONDUCTIVE FILM, METHOD OF PRODUCING THE SAME, AND TOUCH PANEL

(71) Applicant: FUJIFILM Corporation, Tokyo (JP)

(72) Inventors: Kensuke Katagiri, Kanagawa (JP); Shin Tajiri, Kanagawa (JP); Toshinari Fujii, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 155 days.

(21) Appl. No.: 15/694,870

(22) Filed: Sep. 4, 2017

(65) Prior Publication Data

US 2017/0372816 A1    Dec. 28, 2017

Related U.S. Application Data

(63) Continuation of application No. PCT/JP2015/080199, filed on Oct. 27, 2015.

(30) Foreign Application Priority Data

Mar. 30, 2015  (JP) ................................. 2015-069367

(51) Int. Cl.
*G03C 1/04*  (2006.01)
*H01B 5/14*  (2006.01)
(Continued)

(52) U.S. Cl.
CPC .............. *H01B 5/14* (2013.01); *G03C 1/053* (2013.01); *G03C 1/46* (2013.01); *G03C 1/74* (2013.01);
(Continued)

(58) Field of Classification Search
CPC ........... H01B 5/14; H01B 1/026; G06F 3/044; G06F 2203/04103; G03C 1/46;
(Continued)

(56) References Cited

U.S. PATENT DOCUMENTS 9,405,422 B2   8/2016  Tajiri et al.
9,820,377 B2  11/2017  Katagiri et al.
(Continued)

FOREIGN PATENT DOCUMENTS

JP  2013-012604   1/2013
JP  2014-209332  11/2014
JP  2015-005495   1/2015

OTHER PUBLICATIONS

"International Search Report (Form PCT/ISA/210) of PCT/JP2015/080199," dated Jan. 12, 2016, with English translation thereof, pp. 1-3.
(Continued)

*Primary Examiner* — Shaheda A Abdin
(74) *Attorney, Agent, or Firm* — JCIPRNET

(57) ABSTRACT

The conductive film is arranged on the support and contains a binder and a metal portion, in which a position at which the contour line reaches the metal portion included in the thin conductive wire is set as an upper end position, and an average area ratio VA of the metal portion in a region ranging from the upper end position to 100 nm toward the support side is 1% or more and less than 50%, and a position at which the contour line reaches the thin conductive wire does not include the metal portion is set to a lower end position, and an average area ratio VM1 of the metal portion in a region ranging from a middle position between the upper end position and the lower end position to 50 nm toward the support side and to 50 nm toward the surface X side is 50% or more.

20 Claims, 5 Drawing Sheets

(51) Int. Cl.
*G03C 1/46* (2006.01)
*G03C 1/74* (2006.01)
*G06F 3/044* (2006.01)
*G03C 1/053* (2006.01)
*H01B 1/02* (2006.01)
*H01B 13/00* (2006.01)

(52) U.S. Cl.
CPC ............ *G06F 3/044* (2013.01); *H01B 1/026* (2013.01); *H01B 13/0036* (2013.01); *G03C 2001/041* (2013.01); *G03C 2001/042* (2013.01); *G06F 2203/04103* (2013.01); *G06F 2203/04112* (2013.01)

(58) Field of Classification Search
CPC .... G03C 1/74; G03C 1/053; G03C 2001/042; G03C 2001/041
USPC ........................... 345/173, 174; 430/19, 325
See application file for complete search history.

(56) References Cited

U.S. PATENT DOCUMENTS

| | | | |
|---|---|---|---|
| 2009/0090694 A1* | 4/2009 | Hotelling ............... | G06F 3/044 216/41 |
| 2009/0096759 A1* | 4/2009 | Nishiwaki .............. | G06F 3/041 345/173 |
| 2010/0214233 A1* | 8/2010 | Lee ......................... | G06F 3/044 345/173 |
| 2014/0299357 A1* | 10/2014 | Nakamura ............. | G06F 3/044 174/250 |

OTHER PUBLICATIONS

"Written Opinion of the International Searching Authority (Form PCT/ISA/237) of PCT/JP2015/080199," dated Jan. 12, 2016, with English translation thereof, pp. 1-7.

* cited by examiner ial Application No. PCT/JP2015/080199 filed on Oct. 27, 2015, which claims priority under 35 U.S.C § 119 (a) to Japanese Patent Application No. 2015-069367 filed on Mar. 30, 2015. Each of the above application(s) is hereby expressly incorporated by reference, in its entirety, into the present application.

BACKGROUND OF THE INVENTION

1. Field of the Invention

The present invention relates to a conductive film, particularly relates to a conductive film having a thin conductive wire which has excellent conductive characteristics and is prevented from being visible due to external light, and a method of producing the same. The present invention also relates to a touch panel including the conductive film.

2. Description of the Related Art

A conductive film in which thin conductive wires are formed on a support is widely used for an electrode for various electronic devices such as a solar cell, an inorganic electroluminescence (EL) element, and an organic EL element, and an electromagnetic wave shield, a touch panel, and a transparent plane heat generating body for various display devices. Particularly, in recent years, the mounting rate of a touch panel on a cellular phone, a portable game machine, or the like has increased and thus there has been a rapidly increasing demand for a conductive film used as a sensor for a touch panel.

As such a conductive film, for example, JP2013-012604A discloses a conductive film having a mesh pattern formed by a thin conductive wire (thin metal wire) including a metal portion such as metal silver.

SUMMARY OF THE INVENTION

In recent years, in response to need for improvement of performance of various devices, there has been a demand for further improving the conductive characteristics of a thin conductive wire in a conductive film. More specifically, there has been a demand for further lowering the volume resistivity of a thin conductive wire.

As a method of lowering the volume resistivity of a thin conductive wire, there is a method of increasing the amount of a metal portion in a thin conductive wire. On the other hand, since visible light is strongly reflected due to the characteristics of metal in such a thin conductive wire, the thin conductive wire is easily viewed. Particularly, in order to apply the thin conductive wire to a detection electrode of a touch panel (sensor electrode), in a case in which a mesh pattern formed by the thin conductive wire is prepared, the reflectivity of external light peculiar to metal is increased and the mesh pattern is easily viewed. Further, in a case in which the main component of the metal portion included in the thin conductive wire in the mesh pattern is silver, there arise problems that the reflected light of external light is yellowish and the reflected light of a white light source seems to be colored due to plasmon resonance caused by the fine structure of the silver.

That is, a trade-off relation between improvement of the conductive characteristics of the thin conductive wire and difficulty in visibility thereof is established in many cases and it is required to satisfy the both at a higher level.

In consideration of the above circumstances, an object of the present invention is to provide a conductive film having a thin conductive wire which has excellent conductive characteristics and is hardly visible and a method of producing the same.

Another object of the present invention is to provide a touch panel including the conductive film.

As a result of conducting intensive investigations on the above problems, the present inventors have found that it is possible to obtain a desired effect by controlling a distribution state of a metal portion in a thin conductive wire.

That is, the above problems can be solved by adopting the following configurations.

(1) A conductive film comprising:
a support; and
a thin conductive wire that is arranged on the support and contains a binder and a metal portion,
in which in a case in which a contour line along a surface shape of a surface X of the thin conductive wire is moved in a vertical section of the thin conductive wire from the surface X of the thin conductive wire, which is on a side opposite to the support side, to the support side, a position at which the contour line reaches the metal portion included in the thin conductive wire is set as an upper end position, and an average area ratio VA of the metal portion in a region ranging from the upper end position to 100 nm toward the support side is 1% or more and less than 50%, and
in a case in which the contour line is moved from the upper end position to the support side, a position at which the contour line reaches the thin conductive wire does not include the metal portion is set to a lower end position, and an average area ratio VM1 of the metal portion in a region ranging from a middle position between the upper end position and the lower end position to 50 nm toward the support side and to 50 nm toward the surface X side is 50% or more.

(2) The conductive film according to (1), in which an average area ratio VB of the metal portion in a region ranging from the lower end position to 100 nm toward the surface X side is 1% or more and less than 50%.

(3) A conductive film comprising:
a support; and
a thin conductive wire that is arranged on the support and contains a binder and a metal portion,
in which in a case in which a contour line along a surface shape of a surface X of the thin conductive wire is moved in a vertical section of the thin conductive wire from the support side to the surface X of the thin conductive wire on a side opposite to the support side, a position at which the contour line reaches the metal portion included in the thin conductive wire is set as a lower end position, and an average area ratio VC of the metal portion in a region ranging from the lower end position to 100 nm toward the surface X side is 1% or more and less than 50%, and
in a case in which the contour line is moved from the lower end position to the surface X side, a position at which the contour line reaches the thin conductive wire does not include the metal portion is set to an upper end position, and an average area ratio VM2 of the metal portion in a region ranging from a middle position between the upper end position and the lower end position to 50 nm toward the support side and to 50 nm toward the surface X side is 50% or more.

(4) The conductive film according to any one of (1) to (3), in which the binder includes fine nonmetal particles and the fine nonmetal particles are present at least between the upper end position and the lower end position.

(5) The conductive film according to any one of (1) to (4), in which the metal portion contains at least one selected from the group consisting of gold, silver, copper, nickel, and palladium.

(6) A method of producing the conductive film according to any one of (1) to (4) in which the binder contains a polymer and the metal portion contains metal silver, the method comprising:

forming a silver halide-containing photosensitive layer by applying a silver halide-containing coating liquid containing silver halide, gelatin, and a first polymer different from the gelatin and a composition adjusted coating liquid containing a second polymer different from the gelatin to a support by simultaneous multilayer coating;

forming a conductive portion containing metal silver by exposing the silver halide-containing photosensitive layer and then performing a development treatment on the silver halide-containing photosensitive layer; and obtaining the conductive film by removing the gelatin in the conductive portion.

(7) A method of producing the conductive film according to (1) or (2) in which the binder contains a polymer and the metal portion contains metal silver, the method comprising:

forming a silver halide-containing photosensitive layer 1 by applying a silver halide-containing coating liquid 1 containing silver halide, gelatin, and a first polymer different from the gelatin to a support;

forming a multilayer film containing the silver halide-containing photosensitive layer 1 and a silver halide-containing photosensitive layer 2 by applying a silver halide-containing coating liquid 2 containing silver halide, gelatin, and a second polymer different from the gelatin to the silver halide-containing photosensitive layer 1 to form the silver halide-containing photosensitive layer 2;

forming a conductive portion containing metal silver by exposing the multilayer film and then performing a development treatment on the multilayer film; and obtaining the conductive film by removing the gelatin in the conductive portion, in which a ratio R2 of a mass Y2 of the second polymer with respect to a mass Z2 of the silver halide in the silver halide-containing coating liquid 2 is larger than a ratio R1 of a mass Y1 of the first polymer with respect to a mass Z1 of the silver halide in the silver halide-containing coating liquid 1.

(8) A method of producing the conductive film according to (4) in which the binder contains a polymer and the metal portion contains metal silver, the method comprising:

forming a silver halide-containing photosensitive layer by applying a silver halide-containing coating liquid containing silver halide, gelatin, and a first polymer different from the gelatin and a composition adjusted coating liquid containing fine nonmetal particles to a support by simultaneous multilayer coating;

forming a conductive portion containing metal silver by exposing the silver halide-containing photosensitive layer and then performing a development treatment on the silver halide-containing photosensitive layer; and obtaining the conductive film by removing the gelatin in the conductive portion.

(9) A touch panel comprising: the conductive film according to any one of (1) to (5).

According to the present invention, it is possible to provide a conductive film having a thin conductive wire which has excellent conductive characteristics and is hardly visible, and a method of producing the same.

According to the present invention, it is also possible to provide a touch panel including the conductive film.

DESCRIPTION OF THE PREFERRED EMBODIMENTS

Hereinafter, suitable embodiments of a conductive film and a method of producing the same of the present invention will be described.

First, one feature of the present invention is to control the distribution of a metal portion in a thin conductive wire. When the present inventors conducted investigations on problems of the related art, it was found that in a case in which a large number of metal portions are present in a region on a visible side in a thin conductive wire, external light reflection easily occurs and the thin conductive wire is easily visible.

In a first embodiment of a conductive film of the present invention, it is found that by reducing the amount of a metal portion in an upper region, which will be described later, on a surface X side of a thin conductive wire on the side opposite to the support side and providing a difference between the amount of a metal portion near a middle region, which will be described later, in the thin conductive wire, external light reflection can be suppressed and in a case in which the thin conductive wire is visible from the surface X side, the thin conductive wire is hardly visible, thereby achieving excellent color tone. In this case, the amount of the metal portion near the middle region is set to be equal to or more than a predetermined amount, and thus the excellent conductive characteristics of the thin conductive wire are secured. That is, as described above, by decreasing the density of the metal portion in the thin conductive wire on the surface X side and increasing the density of the metal portion of the thin conductive wire near the middle portion, both conductive characteristics and difficulty in visibility are obtained. Particularly, in a case in which the thin conductive wire is used to form a mesh pattern, the mesh pattern itself is also hardly visible and an observer hardly recognizes the presence of the mesh pattern.

In addition, in a second embodiment of the conductive film of the present invention, based on the same design concept as described above, in a case in which the thin conductive wire is visible from the support side, the amount of the metal portion in a lower region, which will be described later, in the thin conductive wire on the support side is reduced to make the thin conductive wire hardly visible, and the amount of the metal portion near the middle region, which will be described later, in the thin conductive wire is set to be equal to or more than a predetermined amount to secure the conductive characteristics of the thin conductive wire.

In addition, the conductive film has a feature of improvement of resistance to scratches or the like.

First Embodiment

Hereinafter, the first embodiment of the conductive film of the present invention will be described with reference to the drawings.

Figure 1:
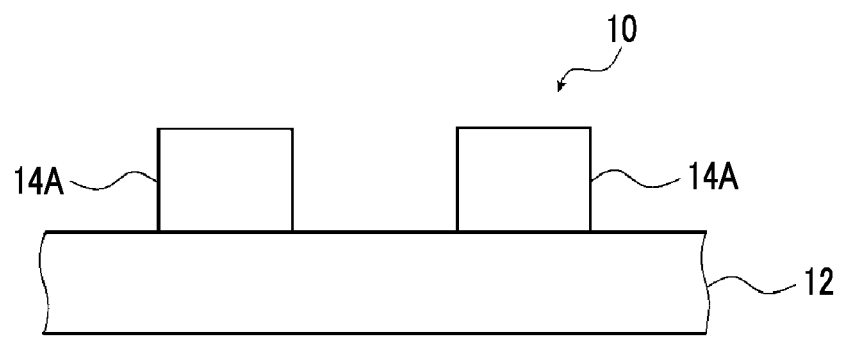
FIG. 1 is a cross-sectional view showing a first embodiment of a conductive film of the present invention.

FIG. 1 shows a cross-sectional view of the first embodiment of the conductive film of the present invention.

A conductive film 10 includes a support 12, and a thin conductive wire 14A that IS arranged on the support 12. In FIG. 1, two thin conductive wires 14A are shown but the number of conductive wires is not particularly limited.

Figure 2A:
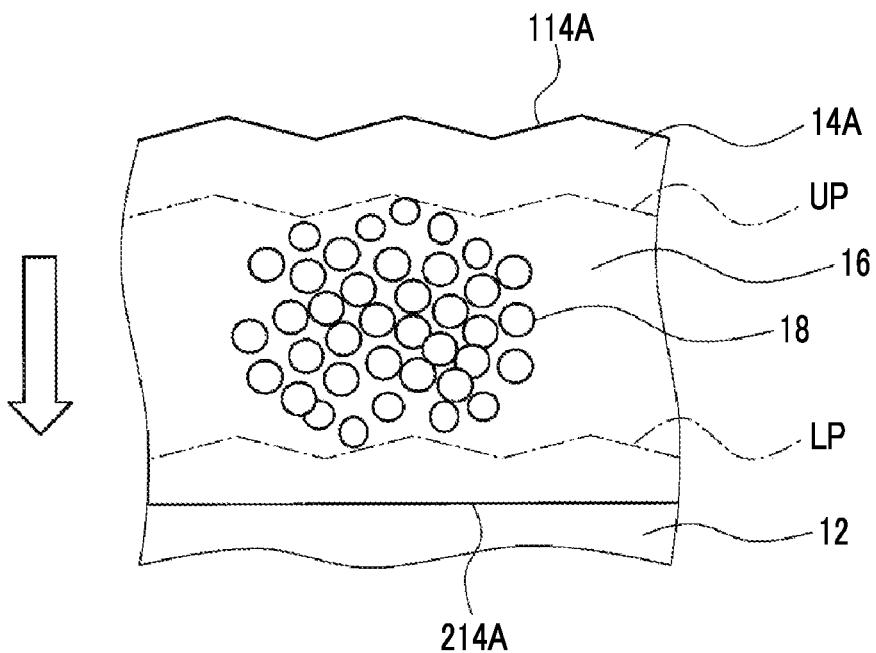
FIG. 2A is a partially enlarged cross-sectional view of a thin conductive wire.

FIG. 2A shows a partially enlarged cross-sectional view of the thin conductive wire 14A. The thin conductive wire 14A includes a polymer 16, and a plurality of metal portions 18 dispersed in the polymer 16. As shown in FIG. 2A, the amount of the metal portion 18 distributed is small in a region near a surface 114A side of the thin conductive wire 14A or a region near a surface 214A and the amount of the metal portion distributed near the middle region in the thin conductive wire 14A is large.

In the following description, first, the distribution state of the metal portion 18 in the thin conductive wire 14A will be described in detail and then the configuration of each member will be described in detail.

First, using FIG. 2A, an upper end position UP and a lower end position LP used to define the distribution state of the metal portion 18 will be described.

As shown in FIG. 2A, in the vertical section of the thin conductive wire 14A (a cross section in a case of cutting the thin conductive wire at a plane vertical to the surface of the thin conductive wire 14A; the method of obtaining the vertical section will be described later), the contour line along the surface shape of the surface 114A of the thin conductive wire 14A is moved from the surface 114A of the thin conductive wire 14A (the surface on the side opposite to the support 12 side) (hereinafter, also referred to as a surface X) to the support 12 side. That is, the contour line along the surface shape of the surface 114A of the thin conductive wire 14A is moved in a direction of a white arrow.

In this case, as shown in FIG. 2A, the position at which the moved contour line reaches the metal portion 18 in the thin conductive wire 14A is set to an upper end position UP. Here, the position at which the contour line reaches the metal portion 18 means a position at which in a case in which the contour line is moved as described above, the contour line is in contact with the metal portion 18 for the first time.

Then, the contour line is further moved from the upper end position UP to the support 12 side and a position at which the contour line reaches the thin conductive wire 14A does not include the metal portion 18 is set to a lower end position LP. Here, the position at which the contour line reaches the thin conductive wire does not include the metal portion 18 means a position at which the metal portion 18 is not included in a region from the position to the surface of the support 12 and a position closest to the surface X side. In order words, the lower end position LP corresponds to a position at which the metal portion that is positioned closest to the support 12 side in the vertical section of the thin conductive wire 14A and the contour line are in contact with each other on the side closest to the support 12.

Figure 3:
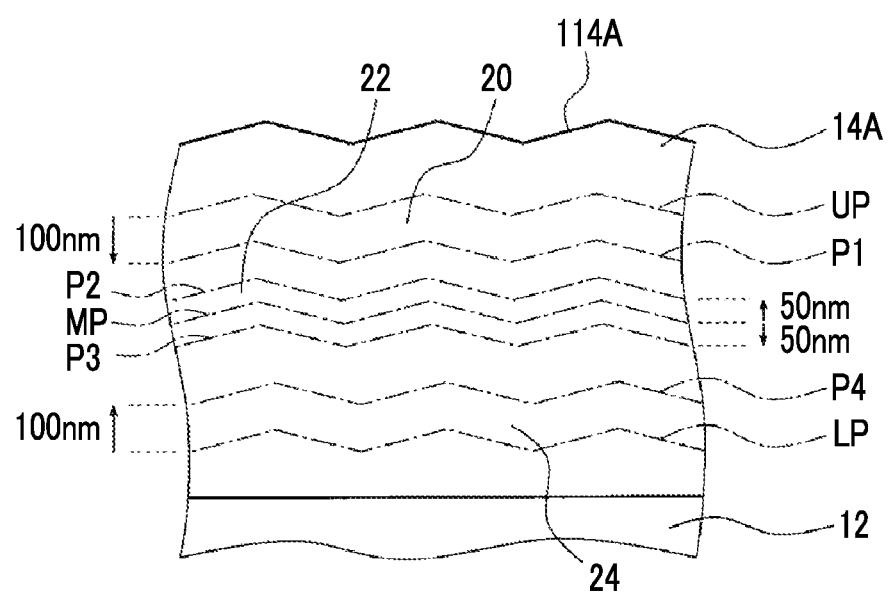
FIG. 3 is an illustration for calculating various average area ratios.

Next, using FIG. 3, a method of obtaining the average area ratio of the metal portions in each region in the thin conductive wire will be described in detail. FIG. 3 is a partially enlarged cross-sectional view of the thin conductive wire 14A as in FIG. 2A and corresponds to a drawing in which the metal portion 18 in FIG. 2A is omitted, and the upper end position UP and the lower end position LP in FIG. 2A are the same positions as the upper end position UP and the lower end position LP in FIG. 3.

In the thin conductive wire 14A, an average area ratio VA of the metal portion in a region ranging from the upper end position UP to 100 nm toward the support 12 side is 1% or more and less than 50%.

First, a position at 100 nm from the upper end position UP to the support 12 side corresponds to a position P1 in which the contour line (the contour line along the surface shape of the surface 114A of the thin conductive wire 14A) is moved 100 nm from the upper end position UP to the support 12 side. That is, a distance between the upper end position UP and the position P1 corresponds to 100 nm. The region interposed between the upper end position UP and the position P1 (hereinafter, also referred to as an upper region 20) corresponds to a region ranging from the upper end position UP to 100 nm toward the support 12 side.

An area ratio Va of the metal portion in the upper region 20 is a value obtained by dividing the area of the metal portion included in the upper region 20 by the area of the upper region 20 and multiplying the obtained value by 100. That is, the area ratio Va of the metal portion is a value obtained by {(area of metal portion included in upper region 20)/(area of upper region 20)}×100. The average area ratio VA is a value obtained by arithmetically averaging 10 area ratios Va obtained from the observation view of the vertical section of the thin conductive wire as described later.

The average area ratio VA is 1% or more and less than 50%, but from the viewpoint that the thin conductive wire is more hardly visible, the average area ratio is preferably 10% to 40% and more preferably 15% to 35%.

In the present invention, as described above, the average area ratio of the metal portions in the region ranging from the upper end position UP to 100 nm toward the support 12 side is adjusted to be in a predetermined range. As described later, the average area ratio of the metal portions a 100 nm region is also defined in each of the middle region and the lower region. The present inventors have found that the visibility of the thin conductive wire is mainly affected by visible light and regarding the size of the region in which the visible light is affected, about 100 nm corresponds to the minimum unit. Actually, as shown in the present specification, as long as the composition in a region range of about 100 nm is adjusted, the reflection characteristics, diffusion characteristics, and interference characteristics of the visible light can be controlled.

Figure 2B:
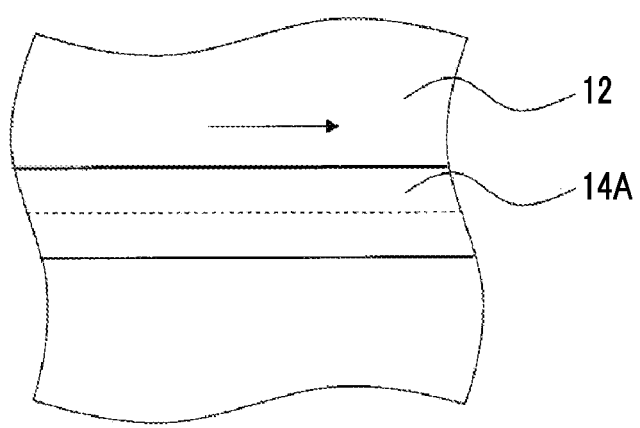
FIG. 2B is a top view of the conductive film showing a cut position of the thin conductive wire in a case in which a vertical section of the thin conductive wire is obtained for calculating an average area ratio of a metal portion.

A method of measuring the area ratio Va of the metal portion in the upper region 20 includes first cutting the center portion of the thin conductive wire in a direction in which the thin conductive wire extends and obtaining the vertical section of the thin conductive wire. More specifically, as shown in FIG. 2B, the center portion (broken line portion) of the thin conductive wire 14A is cut in the arrow direction in which the thin conductive wire arranged on the support 12 extends. The cutting method is not particularly limited as long as the method does not destroy the shape of the metal portion and the polymer (a binder portion including the polymer). A method using a microtome, a focused ion beam (FIB) (Ga ion), or the like can be used. In a case in which the line width of the thin conductive wire is 10 μm or less, FIB is suitable in terms of accuracy. The obtained vertical section of the thin conductive wire is observed such that a continuous portion having a width of about 4 μm in one visual field (a length direction of the thin conductive wire) is imaged at 10 visual fields in total with a scanning transmission electron microscope by selecting an acceleration voltage for generating the contrast between the metal portion and the polymer (binder portion), the ranges of the metal portion and the upper region are specified in each visual field, and the area ratio Va of the metal portion is obtained by the above-described method to set the average value as the average area ratio VA. In the observation view of the one visual field, the thin conductive wire is imaged such that the thin conductive wire is viewed from one end to the other end in the observation view in the width direction and the length thereof is adjusted to be about 4 μm.

In addition, the area of the metal portion can be calculated such that the region of the contrast which indicates the metal portion in the image (observation view) cut out, the upper region in the same image separately prepared is further cut out, and the respective weights are weighed. However, more simply, the area of contrast of each of the metal portion and regions other than the metal portion (for example, a binder portion in which the polymer is present) can be measured by commercially available image processing software. The metal portion and regions other than the metal portion (for example, a binder portion in which the polymer is present) can be distinguished by identifying metal portion and regions other than the metal portion using an energy dispersion X-ray spectroscopy (EDX) and a scanning transmission electron microscope in combination.

From the viewpoint that the thin conductive wire is hardly visible, the average area ratio of the metal portions in a region ranging from the upper end position UP to 200 nm (preferably 400 m and more preferably 500 nm) toward the support 12 side is preferably 1% or more and less than 50%. Within the above range, external light enters the thin conductive wire and is diffused and absorbed in the thin conductive wire so that reflected light can be further reduced. Thus, the thin conductive wire becomes more hardly visible.

In addition, in the thin conductive wire 14A, in a region ranging from a middle position MP, which is between the upper end position UP and the lower end position LP, to 50 nm toward the support 12 side and to 50 nm toward the surface 114A side, an average area ratio VM1 of the metal portions is 50% or more.

First, the middle position MP is a middle position between the upper end position UP and the lower end position LP as shown in FIG. 3. In addition, a position at 50 nm from the middle position MP toward the support 12 side corresponds to a position P2 in which the contour line is moved 50 nm from the middle position MP toward the support 12 side. That is, a distance between the middle position MP and the position P2 corresponds to 50 nm. Further, the position at 50 nm from the middle position MP toward the surface 114A side corresponds to a position P3 in which the contour line is moved 50 nm from the middle position MP toward the surface 114A side. That is, a distance between the middle position MP and the position P3 corresponds to 50 nm. Accordingly, the region interposed between the position P2 and the position P3 (hereinafter, also referred to as a middle region 22) corresponds to the region ranging from the middle position MP to 50 nm toward the support 12 side and to 50 nm toward the surface 114A side.

The area ratio Vm1 of the metal portion in the middle region 22 is a value obtained by dividing the area of the metal portion included in the middle region 22 by the area of the middle region 22 and multiplying the obtained value by 100. That is, the area ratio Vm1 of the metal portion is a value obtained by {(area of metal portion included in middle region 22)/(area of middle region 22)}×100. The average area ratio VM1 is a value obtained by arithmetically averaging 10 area ratios Vm1 obtained from the observation view of the vertical section of the thin conductive wire at 10 points used in the calculation of the average area ratio VA.

The average area ratio VM1 is 50% or more but from the viewpoint of further improving the conductive characteristics of the thin conductive wire, the average area ratio is preferably 50% to 100% and more preferably 80% to 100%.

The average area ratio VM1 of the metal portions in the middle region 22 is obtained by calculating the area ratio Vm1 by obtaining the area of the metal portion included in the middle region and the area of the middle region 22 in the same method as described above (the method of measuring the area ratio Va of the metal portion in the upper region 20) using the observation view (in 10 visual fields) obtained by the method of measuring area ratio Va of the metal portion in the above-described upper region 20 and arithmetically averaging the obtained values.

For one suitable embodiment of the first embodiment of the conductive film, from the viewpoint that the thin conductive wire becomes more hardly visible in a case in which the conductive film is visible from the support side, an average area ratio VB of the metal portions in a region ranging from the lower end position to 100 nm toward the surface X side is preferably 1% or more and less than 50%.

More specifically, a position at 100 nm from the lower end position LP toward the surface 114A side corresponds to a position P4 in which the contour line is moved 100 nm from the lower end position LP toward the surface 114A side. That is, a distance between the lower end position LP and the position P4 corresponds to 100 nm. The region interposed between the lower end position LP and the position P4 (hereinafter, also referred to as a lower region 24) corresponds to a region ranging from the lower end position LP to 100 nm toward the surface 114A side.

The area ratio Vb of the metal portion in the lower region 24 is a value obtained by dividing the area of the metal portion included in the lower region 24 by the area of the lower region 24 and multiplying the obtained value by 100. That is, the area ratio Vb of the metal portion is a value obtained by {(area of metal portion included in lower region 24)/(area of lower region 24)}×100. The average area ratio VB is a value obtained by arithmetically averaging 10 area ratios Vb obtained from the observation view of the vertical section of the thin conductive wire at positions of arbitrary 10 points used in the calculation of the average area ratio VA.

The average area ratio VB is 1% or more and less than 50% but from the viewpoint that the thin conductive wire becomes more hardly visible, the average area ratio is preferably 10% to 40% and more preferably 15% to 35%.

The average area ratio VB of the metal portions in the lower region 24 is obtained by calculating an area ratio Vb by obtaining the area of the metal portion included in the lower region and the area of the lower region 24 in the same method as described above (the method of measuring the area ratio Va of the metal portion in the upper region 20) using the observation view obtained in the method of measuring the area ratio Va of the metal portion in the above-described upper region 20 (in 10 visual fields) and arithmetically averaging the obtained values.

In addition, from the viewpoint that the thin conductive wire becomes more hardly visible, the average area ratio of the metal portion in a region ranging from the lower end position LP to 200 nm (preferably to 400 nm and more preferably to 500 nm) toward the surface 114A side is preferably 1% or more and less than 50%. Within the above range, external light enters the thin conductive wire and is diffused and absorbed in the thin conductive wire so that reflected light can be further reduced. Thus, the thin conductive wire becomes more hardly visible.

Hereinafter, the configurations of the support and the thin conductive wire will be described in detail.

(Support)

The kind of the support is not particularly limited as long as the support can support the thin conductive wire. The support is preferably a transparent support and particularly preferably a plastic film.

Specific examples of the material for forming the support include plastic films having a melting point of about 290° C. or lower, such as polyethylene terephthalate (PET) (258° C.), polycycloolefin (134° C.), polycarbonate (250° C.), acrylic films (128° C.), polyethylene naphthalate (PEN) (269° C.), polyethylene (PE) (135° C.), polypropylene (PP) (163° C.), polystyrene (230° C.), polyvinyl chloride (180° C.), polyvinylidene chloride (212° C.), and TAC (290° C.), and PET, polycycloolefin, and polycarbonate are particularly preferable. The numerical value in ( ) is the melting point. The total light transmittance of the support is preferably 85% to 100%.

The thickness of the support is not particularly limited but can be typically selected in a range of 25 to 500 µm from the viewpoint of applying the support for uses such as a touch panel or an electromagnetic wave shield. In a case in which the support of the conductive film has a function as a touch surface in addition to a function as a support, the thickness of the support can be designed to be more than 500 µm.

One suitable embodiment of the support is a treated support that is subjected to at least one selected from the group consisting of atmospheric pressure plasma treatment, corona discharge treatment, and ultraviolet irradiation treatment. By performing the above treatment, a hydrophilic group such as an OH group is introduced into the surface of the treated support to improve the adhesiveness of the thin conductive wire.

(Thin Conductive Wire)

The thin conductive wire contains a polymer and a metal portion dispersed in the polymer.

The kind of the polymer is not particularly limited and known polymers can be used. Among these, a polymer different from gelatin is preferably used. The polymer different from gelatin will be described in detail later.

The metal portion is a portion which secures the conductive characteristics of the thin conductive wire and the metal portion is formed of metal. As the metal forming the metal portion, form the viewpoint of further improving the conductive characteristics, at least one selected from the group consisting of gold (metal gold), silver (metal silver), copper (metal copper), nickel (metal nickel), and palladium (metal palladium) is preferable.

In FIG. 2A, the metal portion is turned into particles and dispersed in the polymer but there is no limitation thereto. The metal portion may be turned into a layer and dispersed in the thin conductive wire.

In FIG. 2(A), the polymer is used as the binder (binder portion) but other materials may be used as the binder. For example, nonmetal particles may be used as the binder. In addition, in a case in which the binder includes fine nonmetal particles, it is preferable that the fine nonmetal particles are present at least between the upper end position and the lower end position.

Examples of the nonmetal particles include resin particles and metal oxide particles. From the viewpoint of handleability, metal oxide particles are preferable. Examples of the metal oxide particles include silicon oxide particles and titanium oxide particles.

The average particle diameter of the nonmetal particles is not particularly limited but the sphere equivalent diameter thereof is preferably 1 to 1,000 nm, more preferably 10 to 500 nm, and even more preferably 20 to 200 nm. Within the above range, the transparency of the conductive film is excellent and the conductive characteristics of the thin conductive wire are also excellent.

As a method of measuring the sphere equivalent diameter of the nonmetal particles, a method of calculating the sphere equivalent diameter of 50 arbitrary nonmetal particles with an electron microscope and arithmetically averaging the obtained values may be used.

As the binder, the polymer and the fine nonmetal particles may be used in combination.

The line width of the thin conductive wire is not particularly limited but from the viewpoint of balance between the conductive characteristics of the thin conductive wire and difficult in visibility, the line width is preferably 30 µm or less, more preferably 15 µm or less, even more preferably 10 µm or less, particularly preferably 5 µm or less, and most preferably 4 µm or less. The line width is preferably 0.5 µm or more and more preferably 1.0 µm.

The thickness of the thin conductive wire is not particularly limited but from the viewpoint of balance between thinning and conductive characteristics, the thickness is preferably 200 µm or less, more preferably 30 µm or less, even more preferably 10 µm or less, and particularly preferably 0.1 to 5 µm.

Figure 4:
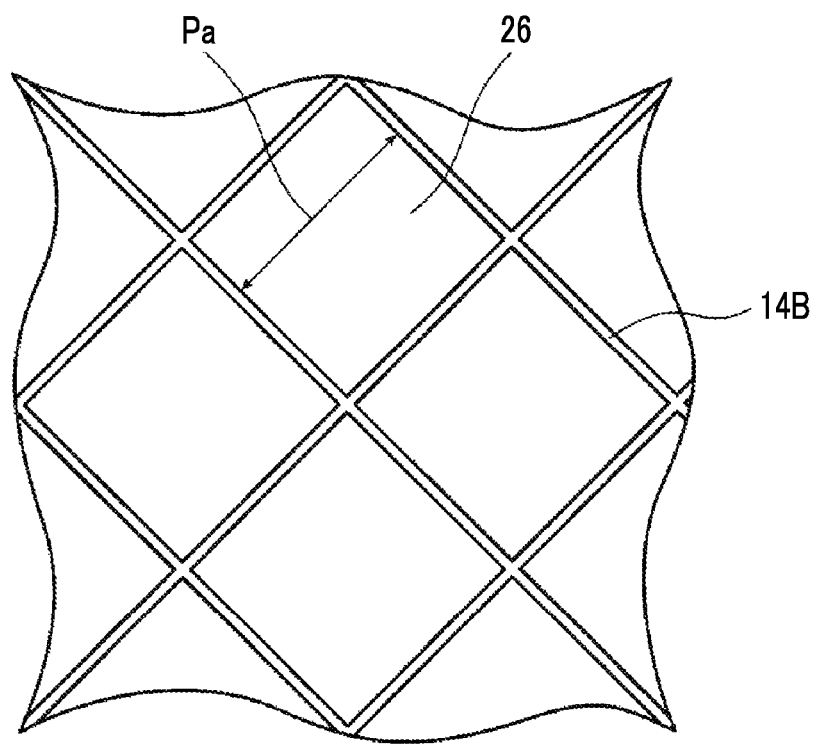
FIG. 4 is a plan view showing an embodiment of a mesh pattern formed by the thin conductive wire.

The thin conductive wire may form a predetermined pattern. For example, the pattern is not particularly limited and a geometric configuration consisting of triangles such as equilateral triangle, isosceles triangle and right triangle, quadrangles such as square, rectangle, rhomboid, parallelogram and trapezoid, (equilateral) n-gons such as (equilateral) hexagon and (equilateral) octagon, circle, ellipse, star and the like in combination is preferable and a mesh shape (mesh pattern) is more preferable. The mesh shape means a shape including a plurality of square openings (lattices) 26 formed by thin conductive wires 14B crossing each other as shown in FIG. 4.

Although the length Pa of one side of the opening 26 is not particularly limited, the length is preferably 1,500 µm or less, more preferably 1,300 µm or less, and even more preferably 1,000 µm or less. The length is preferably 5 µm or more, more preferably 30 µm or more, and even more preferably 80 µm or more. In a case in which the length of the side of the opening is in the above range, more satisfactory transparency can be obtained and in a case in which the conductive film is attached to the front surface of a display device, display is visible without giving a sense of discomfort.

From the viewpoint of visible light transmittance, the opening ratio of the mesh pattern formed by the thin conductive wire is preferably 85% or more, more preferably 90% or more, and most preferably 95% or more. The opening ratio corresponds to a ratio of a region on the support excluding a region in which the thin conductive wire is present in the entirety of the mesh.

The conductive film can be used for various applications. For example, the conductive film can be used for various electrodes (for example, an electrode for a touch panel, an electrode for an inorganic EL element, an electrode for an organic EL element or an electrode for a solar cell), a heating sheet, or a printed wiring board. Among these, the conductive film is preferably used in a touch panel, and particularly preferably used in a capacitance type touch panel.

In addition, as another purpose, the conductive film can also be used as an electromagnetic wave shield which shields electromagnetic waves such as radio waves or microwaves (ultrahigh frequency waves) generated from a personal computer, a work station, and the like and also prevents static electricity. In addition to the electromagnetic wave shield used in the mainframe of a personal computer, the conductive sheet can also be used as an electromagnetic wave shield used in an image capturing device, an electronic medical device, or the like.

Further, the conductive film can be used as a transparent heating body.

<<Method of Producing First Embodiment of Conductive Film>>

A method of producing the first embodiment of the above-described conductive film is not particularly limited and any method may be used as long as a conductive film having the above-described average area ratio of the metal portion can be obtained. Among these, in a case in which the metal portion includes silver (metal silver), from the viewpoint of productivity, the following two methods may be suitably used.

(Method 1): a method of producing a conductive film including forming a silver halide-containing photosensitive layer by applying a silver halide-containing coating liquid containing silver halide, gelatin, and a first polymer different from the gelatin, and a composition adjusted coating liquid containing a second polymer different from the gelatin to a support by simultaneous multilayer coating, forming a conductive portion containing metal silver by exposing the silver halide-containing photosensitive layer and then performing a development treatment on the silver halide-containing photosensitive layer, and obtaining a conductive film by removing the gelatin in the conductive portion.

(Method 2): a method of producing a conductive film including forming a silver halide-containing photosensitive layer 1 by applying a silver halide-containing coating liquid 1 containing silver halide, gelatin, and a first polymer different from the gelatin to a support, obtaining a multilayer film containing a silver halide-containing photosensitive layer 1 and a silver halide-containing photosensitive layer 2 by applying a silver halide-containing coating liquid 2 containing silver halide, gelatin, and a second polymer different from the gelatin to the silver halide-containing photosensitive layer 1 to form the silver halide-containing photosensitive layer 2, forming a conductive portion containing metal silver by exposing the multilayer film and then performing a development treatment on the silver halide-containing photosensitive layer, and obtaining a conductive film by removing the gelatin in the conductive portion, in which a ratio R2 of a mass Y2 of the second polymer with respect to a mass Z2 of the silver halide in the silver halide-containing coating liquid 2 is larger than a ratio R1 of a mass Y1 of the first polymer with respect to a mass Z1 of the silver halide in the silver halide-containing coating liquid 1.

The above (Method 1) and (Method 2) will be described in detail below.

<Method 1>
<First Step>

Hereinafter, each step of Method 1 will be described in detail.

A first step of Method 1 is forming a silver halide-containing photosensitive layer by applying a silver halide-containing coating liquid containing silver halide, gelatin, and a first polymer different from the gelatin, and a composition adjusted coating liquid containing a second polymer different from the gelatin to a support by simultaneous multilayer coating. In order to produce the above-described first embodiment of the conductive film, the silver halide-containing coating liquid and the composition adjusted coating liquid are applied to the support by simultaneous multilayer coating in this order from the support side to be laminated. In the present specification, the expression "applied to the support" includes a case in which the coating liquid is directly applied to the surface of the support and a case in which a separate layer is provided on the support and the coating liquid is applied to the separate layer.

Figure 5:
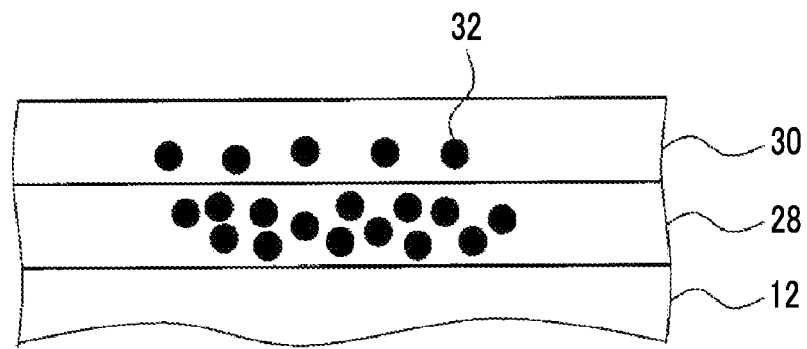
FIG. 5 is a cross-sectional view illustrating a state of simultaneous multilayer coating.

In the step, since the silver halide-containing coating liquid including silver halide and the composition adjusted coating liquid not including silver halide are applied to the support by simultaneous multilayer coating, component diffusion occurs at an interface between two coating films formed by the both coating liquids. More specifically, as shown in FIG. 5, some of silver halide 32 diffuses from the inside of a coating film 28 that is arranged on the support 12 and formed by the silver halide-containing coating liquid (hereinafter, also referred to as a coating film A) to the inside of a coating film 30 that is formed by the composition adjusted coating liquid (hereinafter, also referred to as a coating film B). As a result, the silver halide is included in a region in the coating film B on the coating film A side and the concentration of the silver halide is lower than that of silver halide in the coating film A. That is, the concentration distribution of silver halide can be changed in the coating film. Accordingly, then, by performing the following exposure treatment, the metal portion formed by the silver halide in the coating film B constitutes the metal portion in the upper region of the above-described thin conductive wire and the metal portion formed by the silver halide in the coating film A constitutes the metal portion in the middle portion in the above-described thin conductive wire.

In FIG. 5, the composition adjusted coating liquid does not include silver halide but the composition adjusted coating liquid may include silver halide in a smaller amount (concentration) than in the silver halide-containing coating liquid.

Hereinafter, first, materials used in the step will be described in detail.

(Silver Halide)

The halogen element contained in the silver halide may be any one of chlorine, bromine, iodine, and fluorine, and these elements may be used in combination. For example, silver halide mainly constituted of silver chloride, silver bromide, or silver iodide is preferably used, and silver halide mainly constituted of silver bromide or silver chloride is more preferably used. Silver chlorobromide, silver iodochlorobromide, and silver iodobromide are also preferably used. Among these, silver chlorobromide, silver bromide, silver iodochlorobromide, and silver iodobromide are more preferable, and silver chlorobromide and silver iodochlorobromide containing silver chloride in an amount of equal to or greater than 50 mol % are most preferably used.

Herein, the "silver halide mainly constituted of silver bromide" refers to silver halide in which a molar fraction of bromide ions in a silver halide composition is 50% or more. Particles of the silver halide mainly constituted of silver bromide may contain iodide ions or chloride ions in addition to the bromide ions.

The silver halide is in the form of solid particles. The average particle size of the silver halide is preferably 0.1 to 1,000 nm (1 μm), more preferably 0.1 to 300 nm, and even more preferably 1 and 200 nm, in terms of a sphere equivalent diameter.

The sphere equivalent diameter of the silver halide particles means a diameter of particles having a spherical particle shape and the same volume.

The shape of the silver halide particles is not particularly limited, and the particles can have various shapes such as a spherical shape, a cuboid shape, a flat plate shape (a hexagonal flat plate shape, a triangular flat plate shape, a quadrangular flat plate shape, or the like), an octahedral shape, and a cuboctahedral shape.

In addition, regarding the use of metal compounds belonging to groups VIII and VIIIB, such as a rhodium compound and an iridium compound, and a palladium compound that are used for stabilizing silver halide and for increasing sensitivity of silver halide, the description in paragraphs 0039 to 0042 of JP2009-188360A can be referred to. Moreover, regarding chemical sensitization, the technique described in paragraph 0043 of JP2009-188360A can be referred to.

(Gelatin)

The kind of the gelatin is not particularly limited, and for example, lime-treated gelatin and acid-treated gelatin may be used. It is also possible to use a hydrolysate of gelatin, an enzymatic decomposition product of gelatin, and gelatin modified with another amino group or a carboxyl group (phthalated gelatin or acetylated gelatin).

(First Polymer and Second Polymer)

The kind of the first polymer and the second polymer used (hereinafter, these are collectively referred to as "polymer") is not particularly limited as long as the polymer are different from the gelatin. However, a polymer that is not decomposed by an oxidant decomposing the gelatin, which will be described later, is preferable. For the first polymer and the second polymer, the same polymer may be used.

Examples of the first polymer and the second polymer include a hydrophobic polymer (hydrophobic resin) and the like. More specifically, examples thereof include at least any resin selected from the group consisting of acrylic resin, styrene-based resin, vinyl-based resin, polyolefin-based resin, polyester-based resin, polyurethane-based resin, polyamide-based resin, polycarbonate-based resin, polydiene-based resin, epoxy-based resin, silicone-based resin, a cellulose-based polymer, a chitosan-based polymer, a copolymer composed of a monomer constituting theses resins, and the like.

In addition, the polymer preferably contains a reactive group that reacts with a crosslinking agent which will be described later.

Furthermore, as another suitable embodiment of the polymer, for example, a polymer (copolymer) represented by Formula (1) can be used because the permeation of moisture can be further prevented.

$$-(A)x-(B)y-(C)z-(D)w-$$ Formula (1)

In Formula (1), A, B, C, and D represent the following repeating units respectively.

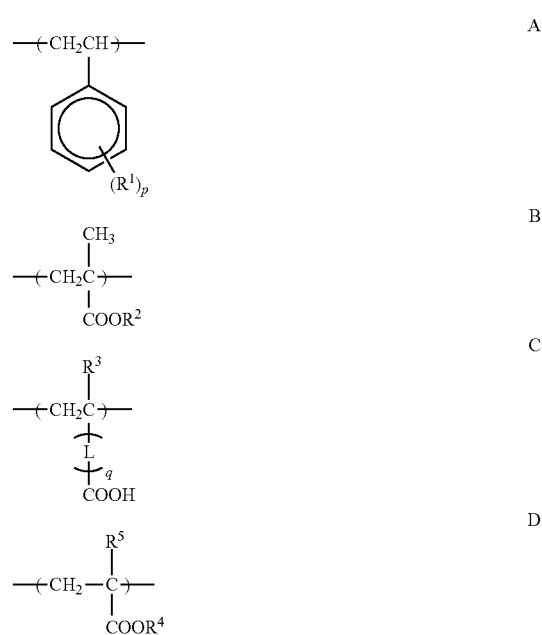

$R^1$ represents a methyl group or a halogen atom, and preferably represents a methyl group, a chlorine atom, or a bromine atom. p represents an integer of 0 to 2. p is preferably 0 or 1, and more preferably 0.

$R^2$ represents a methyl group or an ethyl group, and is preferably a methyl group.

$R^3$ represents a hydrogen atom or a methyl group, and preferably represents a hydrogen atom. L represents a divalent linking group, and is preferably a group represented by Formula (2).

$$-(CO-X^1)r-X^2-$$ Formula (2)

In the formula, $X^1$ represents an oxygen atom or $-NR^{30}-$. Herein, $R^{30}$ represents a hydrogen atom, an alkyl group, an aryl group, or an acyl group, and each of these may have a substituent (for example, a halogen atom, a nitro group, or a hydroxyl group). $R^{30}$ is preferably a hydrogen atom, an alkyl group having 1 to 10 carbon atoms (for example, a methyl group, an ethyl group, a n-butyl group, or a n-octyl group), or an acyl group (for example, an acetyl group or a benzoyl group). $X^1$ is particularly preferably an oxygen atom or $-NH-$.

$X^2$ represents an alkylene group, an arylene group, an alkylene arylene group, an arylene alkylene group, or an alkylene arylene alkylene group. $-O-$, $-S-$, $-OCO-$, $-CO-$, $-COO-$, $-NH-$, $-SO_2-$, $-N(R^{31})-$, $-N(R^{31})SO_2-$, or the like may be inserted into the middle of these groups. Herein, $R^{31}$ represents a linear or branched alkyl group having 1 to 6 carbon atoms, such as a methyl group, an ethyl group, or an isopropyl group. Preferable examples of $X^2$ include a dimethylene group, a trimethylene group, a tetramethylene group, an o-phenylene group, a m-phenylene group, a p-phenylene group, —CH$_2$CH$_2$OCOCH$_2$CH$_2$—, —CH$_2$CH$_2$OCO(C$_6$H$_4$)—, and the like.

r represents 0 or 1.

q represents 0 or 1 and is preferably 0.

R$^4$ represents an alkyl group having 5 to 80 carbon atoms, an alkenyl group, or an alkynyl group. R$^4$ is preferably an alkyl group having 5 to 50 carbon atoms, more preferably an alkyl group having 5 to 30 carbon atoms, and even more preferably an alkyl group having 5 to 20 carbon atoms.

R$^5$ represents a hydrogen atom, a methyl group, an ethyl group, a halogen atom, or —CH$_2$COOR$^6$. R$^5$ is preferably a hydrogen atom, a methyl group, a halogen atom, or —CH$_2$COOR$^6$, more preferably a hydrogen atom, a methyl group, or —CH$_2$COOR$^6$, and particularly preferably a hydrogen atom.

R$^6$ represents a hydrogen atom or an alkyl group having 1 to 80 carbon atoms. R$^6$ may be the same as or different from R$^4$. The number of carbon atoms in R$^6$ is preferably 1 to 70, and more preferably 1 to 60.

In Formula (1), each of x, y, z, and w represents a molar ratio of each of the repeating units.

x represents 3 to 60 mol %, preferably represents 3 to 50 mol %, and more preferably represents 3 to 40 mol %.

y represents 30 to 96 mol %, preferably represents 35 to 95 mol %, and particularly preferably represents 40 to 90 mol %.

z represents 0.5 to 25 mol %, preferably represents 0.5 to 20 mol %, and more preferably represents 1 to 20 mol %.

w represents 0.5 to 40 mol % and preferably represents 0.5 to 30 mol %.

In Formula (1), a case in which x represents 3 to 40 mol %, y represents 40 to 90 mol %, z represents 0.5 to 20 mol %, and w represents 0.5 to 10 mol % is particularly preferable.

The polymer represented by Formula (1) is preferably a polymer represented by Formula (2) and Formula (3).

Formula (2)

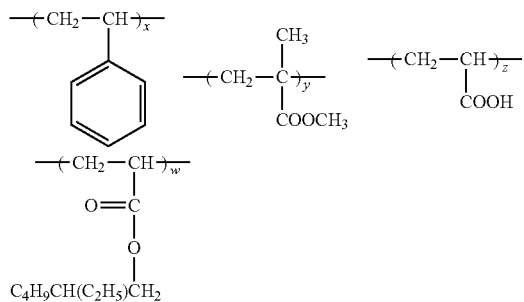

In Formula (2), x, y, z and w have the same definition as described above.

Formula (3)

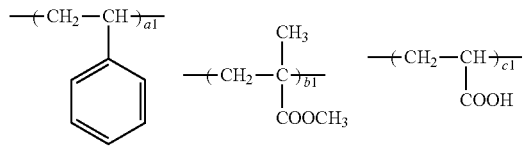

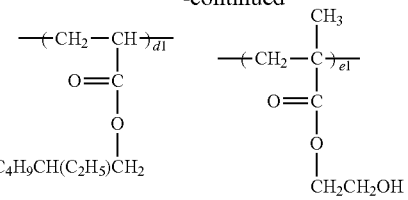

In formulae, each of a1, b1, c1, d1, and e1 represents a molar ratio of each of monomer units, a1 represents 3 to 60 (mol %), b1 represents 30 to 95 (mol %), c1 represents 0.5 to 25 (mol %), d1 represents 0.5 to 40 (mol %), and e1 represents 1 to 10 (mol %).

A preferable range of a1 is the same as the preferable range of x, a preferable range of b1 is the same as the preferable range of y, a preferable range of c1 is the same as the preferable range of z, and a preferable range of d1 is the same as the preferable range of w.

e1 represents 1 to 10 mol %, preferably represents 2 to 9 mol %, and more preferably represents 2 to 8 mol %.

The weight-average molecular weight of the polymer represented by Formula (1) is preferably 1,000 to 1,000,000, more preferably 2,000 to 750,000, and even more preferably 3,000 to 500,000.

The polymer represented by Formula (1) can be synthesized with reference to, for example, JP3305459B and JP3754745B.

(Solvent)

The silver halide-containing coating liquid and the composition adjusted coating liquid include solvents.

Examples of the solvents to be used include water, an organic solvent (for example, alcohols such as methanol, ketones such as acetone, amides such as formamide, sulfoxides such as dimethyl sulfoxide, esters such as ethyl acetate, and ethers), ionic liquids, and a mixed solvent of these.

(Others)

If necessary, the silver halide-containing coating liquid and the composition adjusted coating liquid may include materials other than the above-described materials. For example, the silver halide-containing coating liquid and the composition adjusted coating liquid preferably include a crosslinking agent used for cross-linking the aforementioned polymers (first polymer and second polymer) to each other. The silver halide-containing coating liquid and the composition adjusted coating liquid contain the crosslinking agent, cross-linking proceeds between the polymers. Accordingly, even after the gelatin is decomposed and removed in the step which will be described later, the metal silver particles in the thin conductive wire remain linked to each other, and consequentially, a conductive film having excellent conductive characteristics is obtained.

(Procedure)

A method of applying the silver halide-containing coating liquid and the composition adjusted coating liquid by simultaneous multilayer coating is not particularly limited and a known method can be adopted. For example, it is preferable to use a die coating method. The die coating method includes a slide coating method, an extrusion coating method, and a curtain coating method. However, a slide coating method and an extrusion coating method are preferable and an extrusion coating method which exhibits high thin layer coating suitability is most preferable.

In the case of the simultaneous multilayer coating, from the viewpoint of obtaining the form of the first embodiment of the above-described conductive film, the composition adjusted coating liquid including the second polymer and having a composition such that the thickness of a film (surface film) to be formed in a case in which the coating liquids are applied to a predetermined substrate when the film is dried is 100 nm or more is preferably used.

In addition, after the simultaneous multilayer coating is performed, if necessary, the obtained coating films may be subjected to a drying treatment. By performing the drying treatment, the solvents included in the coating film obtained by the silver halide-containing coating liquid and the coating film obtained by the composition adjusted coating liquid can be easily removed.

Through the above treatments, a silver halide-containing photosensitive layer (hereinafter, also imply referred to as "photosensitive layer") can be formed on the support.

<Second Step>

A second step of Method 1 is forming a conductive portion containing metal silver by exposing the photosensitive layer and then performing a development treatment on the photosensitive layer. By performing the step, the silver halide is reduced and the conductive portion containing metal silver is formed. The exposure treatment is typically performed in a pattern shape and the conductive portion containing metal silver is formed in the exposed portion. On the other hand, in the unexposed portion, the silver halide is eluted by the development treatment, which will be described later, and a non-conductive portion including the gelatin and the polymer is formed. The non-conductive portion substantially does not include metal silver and the non-conductive portion means a region which does not exhibit conductivity.

Hereinafter, the exposure treatment and the development treatment performed in the step will be described in detail.

The exposure treatment is a treatment of subjecting photosensitive layer to exposure. The photosensitive layer is subjected to exposure in a pattern shape, and thus the silver halide in the photosensitive layer forms a latent image in the exposed region. The region in which the latent image is formed is formed into a conductive portion by the development treatment which will be described later. On the other hand, in an unexposed region which is not subjected to exposure, in a case of the development treatment which will be described later, the silver halide is dissolved and flows out from the photosensitive layer, and thus a transparent film (non-conductive portion) is obtained.

The light source used in a case of exposure is not particularly limited. Examples thereof include light such as visible rays and ultraviolet rays, radiation such as X-rays, and the like.

The method for performing the pattern exposure is not particularly limited. For example, the pattern exposure may be performed by either surface exposure using a photomask or scanning exposure using laser beams. Herein, the shape of the pattern is not particularly limited, and appropriately adjusted depending on the pattern of the thin conductive wires to be formed.

The method of the development treatment is not particularly limited, and for example, it is possible to use the technique of typical development treatment used for a silver salt photographic film, a photographic paper, a film for making a printing plate, an emulsion mask for a photomask, and the like.

The kind of the developer used in a case of the development treatment is not particularly limited, and for example, it is possible to use a phenidone hydroquinone (PQ) developer, a metol hydroquinone (MQ) developer, a metol ascorbic acid (MAA) developer, and the like.

The development treatment can include a fixing treatment performed for stabilizing the photosensitive layer by removing silver halide in the unexposed portion. For the fixing treatment, it is possible to use the technologies of the fixing treatment used for a silver halide photographic film, a photographic printing paper, a film for making a printing plate, an emulsion mask for a photomask, and the like.

In the fixing treatment, the fixing temperature is preferably about 20° C. to about 50° C., and more preferably 25° C. to 45° C. The fixing time is preferably 5 seconds to 1 minute, and more preferably 7 seconds to 50 seconds.

The photosensitive layer having undergone the development and the fixing treatment is preferably subjected to a washing treatment using water or to a stabilization treatment.

<Third Step>

A third step of Method 1 is obtaining a conductive film by removing the gelatin in the conductive portion obtained in the second step. By performing the step, the gelatin is decomposed and removed from the photosensitive layer (so-called conductive portion and non-conductive portion) having undergone the exposure and development treatment and thus a thin conductive wire having predetermined characteristics is formed. Particularly, the gelatin is removed from the conductive portion and the density of the metal portion (for example, the density of the metal portion in the middle region) is increased. However, in a case in which sufficient conductivity is obtained without performing the third step, or the like, the third step can be appropriately omitted.

The procedure of the step is not particularly limited as long as the gelatin can be removed. For example, a method of decomposing and removing gelatin using a proteolytic enzyme, a method of decomposing and removing gelatin using a predetermined oxidizing agent, and the like may be used.

As a method of decomposing and removing gelatin using a proteolytic enzyme, for example, a method described in paragraphs 0084 to 0087 of JP2014-209332A may be adopted.

In addition, as a method of decomposing and removing gelatin using a predetermined oxidizing agent, for example, a method described in paragraphs 0064 to 0066 of JP2014-112512A may be adopted.

MODIFICATION EXAMPLES

As a modification example of Method 1, an embodiment in which in the above-described first step, the composition adjusted coating liquid, the silver halide-containing coating liquid, and the composition adjusted coating liquid are applied in this order from the support side by simultaneous multilayer coating may be adopted. That is, a method in which three coating liquids are applied by simultaneous multilayer coating to provide layers having a low metal portion density on to both surfaces of the thin wire may be used.

In a case in which the simultaneous multilayer coating is performed such that the composition adjusted coating liquid, the silver halide-containing coating liquid, and the composition adjusted coating liquid are laminated in this order from the support side, a coating film B, a coating film A, and the coating film B are laminated in this order on the support and silver halide diffuses into the respective two coating films B positioned on both surfaces of the coating film A. As a result, a region in the two coating films B on the coating film A side includes silver halide but the concentration thereof is lower than the concentration of silver halide in the coating film A. Accordingly, then, by performing the exposure treatment, the metal portion formed by the silver halide in the coating film B on the support side constitutes the metal portion in the lower region of the above-described thin conductive wire, and the metal portion formed by the silver halide in the coating film A constitutes the metal portion in the middle portion of the above-described thin conductive wire. The metal portion formed by the silver halide in the coating film B on the side opposite to the support side constitutes the metal portion in the upper region of the above-described thin conductive wire. Thus, a conductive film as a suitable embodiment of the first embodiment of the above-described conductive film can be obtained.

In the above method, if necessary, in a case of simultaneous multilayer coating, a predetermined additive (for example, a coloring agent) may be added to the composition adjusted coating liquid applied to the support side.

In addition, if necessary, other functional layers may be provided by simultaneous multilayer coating or by separate coating.

As another modification example of Method 1, an embodiment in which instead of or in addition to the second polymer in the composition adjusted coating liquid, fine nonmetal particles are used may be adopted.

Furthermore, in Method 1, steps other than the above first to third steps may be performed, if necessary.

For example, in order to improve the conductive characteristics of the thin conductive wire, a smoothing step of performing a calendar treatment described in paragraphs 0098 to 0100 of JP2014-209332A may be performed after the third step.

In addition, performing a calendar treatment for transferring surface unevenness to the thin conductive wire described in paragraphs 0165 to 0183 of JP2015-5495A may be performed after the third step. This case is more preferable since the effect of improving difficulty in visibility of the thin conductive wire by surface unevenness acts synergistically.

In order to improve the conductive characteristics of the thin conductive wire, performing a heating treatment described in paragraphs 0101 to 0103 of JP2014-209332A may be performed after the third step.

From the viewpoint of further improving the effect of the present invention, it is preferable that after the third step, smoothing the thin conductive wire (preferably, smoothing the thin conductive wire by a calendar treatment) is performed and then performing a heating treatment on the conductive film may be further performed.

<Method 2>

Method 2 is the same as Method 1 except a first steps and obtaining a multilayer film that is a target to be subjected to an exposure and development treatment, and thus steps different from the steps of Method 1 will be described in detail below.

A first step of Method 2 is forming a silver halide-containing photosensitive layer 1 by applying a silver halide-containing coating liquid 1 containing silver halide, gelatin, and a first polymer different from the gelatin to a support.

In addition, the second step of Method 2 is obtaining a multilayer film containing a silver halide-containing photosensitive layer 1 and a silver halide-containing photosensitive layer 2 by applying a silver halide-containing coating liquid 2 containing silver halide, gelatin, and a second polymer different from the gelatin to the silver halide-containing photosensitive layer 1 to form the silver halide-containing photosensitive layer 2.

Each component used in the silver halide-containing coating liquid 1 and the silver halide-containing coating liquid 2 is as described above.

A ratio R2 of the mass Y2 of the second polymer with respect to the mass Z2 of the silver halide in the silver halide-containing coating liquid 2 (Y2/Z2) is larger than a ratio R1 of the mass Y1 of the first polymer with respect to the mass Z1 of the silver halide in the silver halide-containing coating liquid 1 (Y1/Z1) used in the above step. According to the embodiment, two coating films having different concentrations of silver halide can be laminated on the support and thus the first embodiment of the above-described conductive film can be produced.

The range of R1 is preferably more than 0 and 0.10 or less and more preferably more than 0 and 0.05 or less. The range of R2 is preferably 0.05 to 10 and more preferably 0.1 to 1.

In the first step of Method 2, according to the same procedure as in the first step of Method 1 above described, simultaneous multilayer coating may be performed such that the composition adjusted coating liquid and the silver halide-containing coating liquid 1 are laminated in this order from the support side.

By performing the treatments, a conductive film which is a suitable embodiment of the first embodiment of the above-described conductive film can be obtained.

Second Embodiment

Hereinafter, the second embodiment of the conductive film of the present invention will be described with reference to the drawings.

The second embodiment of the conductive film and the above-described first embodiment have the same configuration except the method of calculating the average area ratio of metal in the thin conductive wire and thus a method of calculating the average area ratio of metal will be mainly described in detail below.

Figure 6:
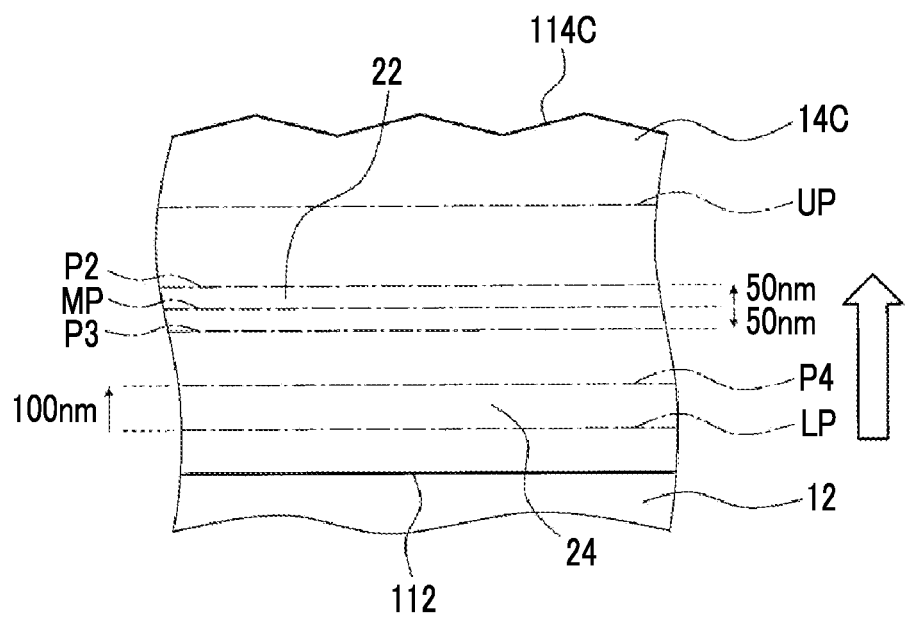
FIG. 6 is a partially enlarged cross-sectional view of a thin conductive wire in a second embodiment of the conductive film of the present invention.

Using FIG. 6, a method of obtaining the average area ratio of the metal portion in each region in the thin conductive wire will be described in detail. FIG. 6 is a partially enlarged view of the thin conductive wire but display of the metal portion is omitted.

First, using FIG. 6, a lower end position LP and an upper end position UP used to define the distribution state of the metal portion 18 will be described.

As shown in FIG. 6, on a vertical section of a thin conductive wire 14C (a cross section in a case of cutting the thin conductive wire at a plane vertical to the surface of the thin conductive wire 14C), the contour line along the surface shape of a surface 112 of the support 12 (the surface on the thin conductive wire 14C side) is moved from the support 12 side to the surface 114C of the thin conductive wire 14C (the surface on the side opposite to the support 12 side). In other words, the contour line along the surface shape of the surface 112 of the support 12 is moved in a direction of a white arrow.

In this case, a position at which the moved contour line reaches the metal portion (not shown) in the thin conductive wire 14C is set to a lower end position LP. Here, the position at which the contour line reaches the metal portion means a position at which the contour line is in contact with the metal portion in a case in which the contour line is moved.

Then, the contour line is further moved from the lower end position LP to the surface 114C side of the thin conductive wire 14C and a position at which the contour line reaches the thin conductive wire 14C does not include the metal portion is set to an upper end position UP. Here, the position at which the contour line reaches the thin conductive wire does not include the metal portion means a position at which the metal portion is not included in a region from the position to the surface 114C of the thin conductive wire 14C and which is a position closest to the support 12 side. The upper end position UP is, in other words, a position at which the metal portion positioned to be closest to the surface 114C side of the thin conductive wire 14C and the contour line are in contact with each other on the side closest to the surface 114C of the thin conductive wire 14C in the vertical section of the thin conductive wire 14C.

In the thin conductive wire 14C, an average area ratio VC of the metal portion in a region ranging from the lower end position LP to 100 nm toward the surface 114C side is 1% or more and less than 50%.

More specifically, at a position at 100 nm from the lower end position LP to the surface 114C side corresponds to a position P4 in which the contour line is moved 100 nm from the lower end position LP to the surface 114C side. That is, a distance between the lower end position LP and the position P4 corresponds to 100 nm. The region interposed between the lower end position LP and the position P4 (hereinafter, also referred to as a lower region 24) corresponds to a region ranging from the lower end position LP to 100 nm toward the surface 114C side.

An area ratio Vc of the metal portions in the lower region 24 is a value obtained by dividing the area of the metal portion included in the lower region 24 by the area of the lower region 24 and multiplying the obtained value by 100. That is, the area ratio Vc of the metal portion is a value obtained by {(area of metal portion included in lower region 24)/(area of lower region 24)}×100. The average area ratio VC is a value obtained by observing the vertical section of the thin conductive wire according to the same procedure as in the method of calculating the above average area ratio VA, and arithmetically averaging 10 area ratios Vc obtained from the observation view.

The average area ratio VC is 1% or more and less than 50%, but from the viewpoint that the thin conductive wire becomes more hardly visible, the average area ratio is preferably 10% to 40% and more preferably 15% to 35%.

More specifically, the average area ratio VC of the metal portions in the lower region 24 is obtained by calculating an area ratio Vc1 by obtaining the area of the metal portion included in the lower region and the area of the lower region 24 in the same manner as described above (the method of measuring the area ratio Va of the metal portion in the upper region 20) using the observation view (10 visual fields) obtained by the method of measuring the area ratio Va of the metal portion in the upper region 20 in the above-described first embodiment, and arithmetically averaging the obtained values.

In addition, from the viewpoint that the thin conductive wire becomes more hardly visible, the average area ratio of the metal portions in a region ranging from the lower end position LP to 200 nm (preferably 400 nm and more preferably 500 nm) toward the surface 114C side is preferably 1% or more and less than 50%. Within the above range, external light enters the thin conductive wire and is diffused and absorbed in the thin conductive wire so that reflected light can be further reduced. Thus, the thin conductive wire becomes more hardly visible.

In the thin conductive wire 14C, an average area ratio VM2 of the metal portions in a region ranging from a middle position MP between the upper end position UP and the lower end position LP to 50 nm toward the support 12 side and to 50 nm toward the surface 114C side is 50% or more.

First, as shown in FIG. 6, the middle position MP is a middle position between the upper end position UP and the lower end position LP. In addition, a position at 50 nm from the middle position MP to the support 12 side corresponds to a position P2 in which the contour line is moved 50 nm from the middle position MP to the support 12 side. That is, a distance between the middle position MP and the position P2 corresponds to 50 nm. Further, the position at 50 nm from the middle position MP toward the surface 114C side corresponds to a position P3 in which the contour line is moved 50 mm from the middle position MP toward the surface 114C side. That is, a distance between the middle position MP and the position P3 corresponds to 50 nm. Accordingly, the region interposed between the position P2 and the position P3 (hereinafter, also referred to as a middle region 22) corresponds to the region ranging from the middle position MP to 50 nm toward the support 12 side and to 50 nm toward the surface 114C side.

The area ratio Vm2 of the metal portion in the middle region 22 is a value obtained by dividing the area of the metal portion included in the middle region 22 by the area of the middle region 22 and multiplying the obtained value by 100. That is, the area ratio of the metal portion is a value obtained by {(area of metal included in middle region 22)/(area of middle region 22)}×100. The average area ratio VM2 is a value obtained by arithmetically averaging 10 area ratios Vm2 obtained from the observation view of the vertical section of the thin conductive wire at 10 points used in the calculation of the average area ratio VC.

The average area ratio VM2 is 50% or more but from the viewpoint of further improving the conductive characteristics of the thin conductive wire, the average area ratio is preferably 50% to 100% and more preferably 80% to 100%.

More specifically, the average area ratio VM2 of the metal portions in the middle region 22 is obtained by calculating the area ratio Vm2 by obtaining the area of the metal portion included in the middle region 22 and the area of the middle region 22 in the same method as described above (the method of measuring the area ratio Va of the metal portion in the upper region 20) of the first embodiment using the observation view (in 10 visual fields) obtained by the method of measuring area ratio VC of the metal portion in the above-described lower region 24 and arithmetically averaging the obtained values.

<<Method of Producing Second Embodiment of Conductive Film>>

A method of producing the second embodiment of the conductive film is not particularly limited and a known method can be adopted. For example, a method in which in the first step of Method 1 described in detail in the above-described method of producing the first embodiment of the conductive film, simultaneous multilayer coating is performed such that the composition adjusted coating liquid and the silver halide-containing coating liquid are laminated in this order from the support side, and then the same procedure as in Method 1 is performed may be used. That is, a method of reversing the application order in the first step of Method 1 and providing a layer in which the density of the metal portion is decreased to the support side may be used.

More specifically, in a case of performing simultaneous multilayer coating is performed such that the composition adjusted coating liquid and the silver halide-containing coating liquid are laminated in this order from the support side, a coating film B and a coating film A are laminated on the support in this order and thus silver halide diffuses from the coating film A to the coating film B on the support side. As a result, a region in the coating film B on the coating film A side includes silver halide and the concentration thereof is lower than the concentration of the silver halide in the coating film A. Accordingly, then, by performing the following exposure treatment, a conductive film in which the metal portion formed by the silver halide in the coating film B on the support side constitutes the metal portion in the lower region of the above-described thin conductive wire and the metal portion formed by the silver halide in the coating film A constitutes the metal portion in the middle portion in the above-described thin conductive wire can be obtained.

In addition, a method in which in Method 2 described in detail in the above-described method of producing the first embodiment of the conductive film, the silver halide-containing photosensitive layer 2 is arranged on the support in advance, the silver halide-containing photosensitive layer 1 is arranged, and then the same procedure as in Method 2 is performed may be used.

The method of producing the conductive film of the present invention is not limited to the above methods and a method of using a silver ink including metal silver (for example, metal silver particles) may be also used. For example, as the method of producing the conductive film according to the first embodiment, a method in which a silver ink A in which the content of metal silver in the total solid content is high is applied to a support in advance and a silver ink B in which the content of metal silver in the solid contents is lower than the content of metal silver in the silver ink A is then applied to the support may be used. As means for lowering the content of metal silver in the silver ink B, a method of adding a polymer, fine nonmetal particles (for example, colloidal silica), and the like at a high concentration (for example, 50% to 99% by mass) may be used. In a case in which the conductive film of the second embodiment is produced, a method in which the silver ink B is applied to the support in advance and then the silver ink V is further applied may be used.

In addition, pattern wiring can be obtained by providing a groove portion of a desired pattern in a resin binder (resin substrate) and applying the above-described silver ink A and silver ink B to the groove portion.

As another method, for example, a method of further applying an ink including metal particles and nonmetal particles (for example, polymer particles, colloidal silica) and having a content of nonmetal particles of 50% to 99% (with respect to the total solid contents) to a metal deposition film may be also used.

The above-described conductive film can be subjected to pattern etching according to a typical method.

EXAMPLES

Hereinafter, the present invention will be described in more detail using examples of the present invention. The materials, the amount of the materials used, the ratio between the materials, the content and the procedures of treatment, and the like shown in the following examples can be appropriately modified as long as the modification does not depart from the gist of the present invention. Accordingly, the scope of the present invention is not interpreted to be limited to the specific examples shown below.

Example 1

(Preparation of Silver Halide Emulsion)

To the following liquid 1 kept at 30° C. and pH 4.5, the following liquid 2 and liquid 3 were simultaneously added in amounts corresponding to 90% of each liquid over 20 minutes while being stirred, thereby forming 0.12 μm of nuclear particles. Subsequently, the following liquid 4 and liquid 5 were added thereto over 8 minutes, and then the remaining 10% of each of the liquid 2 and the liquid 3 were added thereto over 2 minutes, such that the particles grew into 0.15 μm of particles. Further, 0.15 g of potassium iodide was added thereto, the particles were allowed to mature for 5 minutes, and then the formation of particles was ended.

| Liquid 1: | |
|---|---|
| Water | 750 ml |
| Gelatin | 9 g |
| Sodium chloride | 3 g |
| 1,3-Dimethylimidazolidine-2-thione | 20 mg |
| Sodium benzene thiosulfonate | 10 mg |
| Citric acid | 0.7 g |
| Liquid 2: | |
| Water | 300 ml |
| Silver nitrate | 150 g |
| Liquid 3: | |
| Water | 300 ml |
| Sodium chloride | 38 g |
| Potassium bromide | 32 g |
| Potassium hexachloroiridate (III) (0.005% KCl 20% aqueous solution) | 8 ml |
| Ammonium hexachlororhodate (0.001% NaCl 20% aqueous solution) | 10 ml |
| Liquid 4: | |
| Water | 100 ml |
| Silver nitrate | 50 g |
| Liquid 5: | |
| Water | 100 ml |
| Sodium chloride | 13 g |
| Potassium bromide | 11 g |
| Potassium ferrocyanide | 5 mg |

Thereafter, according to a typical method, the resultant was washed with water by a flocculation method. Specifically, the temperature of the resultant was cooled to 35° C. and the pH thereof was reduced by using sulfuric acid until the silver halide was precipitated (the pH was within a range of 3.6±0.2). Next, about 3 L of supernatant liquid was removed (first washing with water). Subsequently, 3 L of distilled water was added thereto, and then sulfuric acid was added thereto until the silver halide was precipitated. Then 3 L of supernatant liquid was removed again (second washing with water). The same operation as the second washing with water was repeated once (third washing with water), and then the step of washing with water and demineralization was ended. The pH of the emulsion obtained after the washing with water and demineralization was adjusted to 6.4, and the pAg thereof was adjusted to 7.5. Next, by adding 3.9 g of gelatin, 10 mg of sodium benzene thiosulfonate, 3 mg of sodium benzene thiosulfinate, 15 mg of sodium thiosulfate, and 10 mg of chloroauric acid to the emulsion, chemical sensitization was performed on the emulsion such that the emulsion exhibited optimal sensitivity at 55° C. Thereafter, 100 mg of 1,3,3a,7-tetraazaindene as a stabilizer and 100 mg of Proxel (trade name, manufactured by ICI Co., Ltd.) as a preservative were added thereto. The finally obtained emulsion was an emulsion of cubic silver iodochlorobromide particles that contained 0.08 mol % of silver iodide and silver chlorobromide composed of silver chloride and silver bromide at a ratio of 70 mol % and 30 mol %, and had an average particle size of 0.15 μm and a coefficient of variation of 10%.

(Preparation of Silver Halide-Containing Coating Liquid 1)

To the aforementioned emulsion, 1,3,3a,7-tetraazaindene in an amount of $1.2 \times 10^{-4}$ mol/mol Ag, hydroquinone in an amount of $1.2 \times 10^{-2}$ mol/mol Ag, citric acid in an amount of $3.0 \times 10^{-4}$ mol/mol Ag, and 2,4-dichloro-6-hydroxy-1,3,5-triazine sodium salt in an amount of 0.90 g/mol Ag and a trace amount of a film hardening agent were added. By using citric acid, the pH of the coating liquid was adjusted to be 5.6.

To the coating liquid, polymer latex containing a polymer represented by (P-1) shown below (hereinafter, simply referred to as "polymer"), a dispersant composed of dialkylphenyl PEO sulfuric acid ester, and water (mass ratio of dispersant/polymer was 2.0/100=0.02, solid content concentration: 22% by mass) was added such that a mass ratio of the polymer to the gelatin became 0.2/1. Here, in the silver halide-containing coating liquid 1, a ratio R1 of the mass of the polymer with respect to the mass of the silver halide (polymer/silver halide) was 0.024.

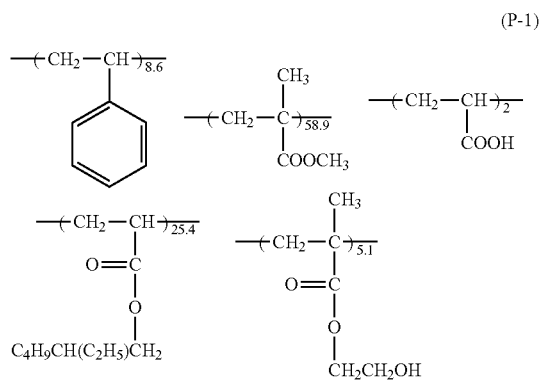

(P-1)

Furthermore, as a crosslinking agent, EPOXY RESIN DY 022 (product name, manufactured by Nagase ChemteX Corporation) was added thereto. The amount of the crosslinking agent added was adjusted such that the amount of the crosslinking agent in the photosensitive layer, which will be described later, became 0.09 g/m².

In this manner, a silver halide-containing coating liquid 1 was prepared.

The polymer represented by (P-1) above was synthesized with reference to JP3305459B and JP3754745B.

(Photosensitive Layer Forming Step (Part 1))

On one surface of a biaxially oriented PET support having a thickness of 40 μm, a composition for forming an undercoat layer, which will be described later, was applied to form an undercoat layer a dry film thickness of 60 nm, and dried at 90° C. for 1 minute. Thus, a support with an undercoat layer was prepared. The film thickness of the undercoat layer was measured with an electronic micro film thickness meter.

(Composition for Forming Undercoat Layer (Curable Composition))

The following components were mixed to prepare a composition for forming an undercoat layer.

| | |
|---|---|
| Acrylic polymer (AS-563A, manufactured by DAICEL FINECHEM LTD., solid content: 27.5% by mass) | 66.4 parts by mass |
| Carbodiimide crosslinking agent (CARBODILITE V-02-L2, manufactured by Nisshinbo Industries, Inc., solid content: 10% by mass) | 16.6 parts by mass |
| Colloidal silica (SNOWTEC XL, manufactured by Nissan Chemical Industries, Ltd., solid content: 10% by mass water diluted) | 4.4 parts by mass |
| Smoothing agent: carnauba wax (SEROSOL 524, manufactured by Chukyo Yushi Co. Ltd., solid content: 3% by mass water diluted) | 27.7 parts by mass |
| Surfactant: anionic surfactant (RAPISOL A-90, manufactured by NOF Corporation, solid content: 1% by mass aqueous solution) | 23.3 parts by mass |
| Surfactant: nonionic surfactant (NAROACTY CL95, manufactured by Sanyo Chemical Industries, Ltd., solid content: 1% by mass aqueous solution) | 14.6 parts by mass |
| Distilled water | 847.0 parts by mass |

Next, to the undercoat layer of the support with the undercoat layer, a composition adjusted coating liquid 1, which will be described later, the silver halide-containing coating liquid 1, and a composition adjusted coating liquid 2, which will be described later, were applied in this order from the undercoat layer by simultaneous multilayer coating such that the coating liquid flow ratio (composition adjusted coating liquid 1/silver halide-containing coating liquid 1/composition adjusted coating liquid 2)=25/25/1 and thus a silver halide-containing photosensitive layer was formed on the support. This layer was set to a film A.

The composition adjusted coating liquid 1 is a composition formed by a mixture obtained by mixing the above polymer latex and gelatin at a mixing mass ratio (mass of polymer/mass of gelatin) of 2/1, and further containing a dye having an optical density of about 1.0 and decolored by alkali of a developer. In addition, the concentration of the composition adjusted coating liquid 1 was adjusted such that the amount (coating amount) of polymer in the layer formed by the composition adjusted coating liquid 1 was 0.65 g/m². The layer formed by the composition adjusted coating liquid 1 has an antihalation function since the dye is included in the coating liquid.

In addition, the composition adjusted coating liquid 2 is a composition obtained by mixing the above polymer latex and gelatin at a mixing mass ratio (polymer/gelatin) of 2/1. The concentration of the composition adjusted coating liquid 2 was adjusted such that the amount of the gelatin in the layer formed by the composition adjusted coating liquid 2 was 0.10 g/m².

Furthermore, in the layer formed by the silver halide-containing coating liquid 1, the amount of the silver was 6.2 g/m$^2$, the amount of the polymer was 0.22 g/m$^2$, and the amount of the gelatin was 1.0 g/m$^2$.

(Exposure and Development Step)

Exposure was performed on one surface of the film A (on the silver halide-containing photosensitive layer side) using parallel light of a high pressure mercury lamp as a light source through a photomask of a square mesh pattern having an opening line width of 2 μm and a pitch of 300 μm. After exposure, development was performed with the following developer and a fixing solution (product name: N3X-R for CN16X, manufactured by Fujifilm Corporation) was used to perform a development treatment. Further, the film was rinsed with pure water and dried, and accordingly, a support in which a conductive mesh formed by thin wires (line width: 2 μm) including Ag and a layer including the gelatin and the polymer were formed was obtained. The layer including the gelatin and the polymer was formed between the thin wires including Ag. The obtained film was set to a film B.

(Composition of Developer)

The following compounds are included in 1 liter (L) of the developer.

| | |
|---|---|
| Hydroquinone | 0.037 mol/L |
| N-methylaminophenol | 0.016 mol/L |
| Sodium metaborate | 0.140 mol/L |
| Sodium hydroxide | 0.360 mol/L |
| Sodium bromide | 0.031 mol/L |
| Potassium metabisulfite | 0.187 mol/L |

(Gelatin Decomposition Treatment)

The film B was immersed in an aqueous solution of a proteolytic enzyme (BIOPLASE AL-15FG manufactured by Nagase ChemteX Corporation) (concentration of proteolytic enzyme: 0.5% by mass, solution temperature: 40° C.) for 120 seconds. The film B was extracted from the aqueous solution, immersed in warm water (solution temperature: 50° C.) for 120 seconds, and then washed. A film C which had been subjected to the gelatin decomposition treatment (corresponding to the conductive film) was obtained.

(Resistance Lowering Treatment)

The film C was subjected to a calendar treatment at a pressure of 30 kN using a calendar device formed by combining a metal roller and a resin roller and then was allowed to pass through a superheated vapor tank at 150° C. for 120 seconds to perform a heating treatment. The film which had been subjected to the heating treatment was set to a film D. The height (distance) from the surface X (the surface on the side opposite to the support side) to the upper end position UP of the film D was 0.050 μm.

Example 2

A conductive film was obtained in the same manner as in Example 1 except that instead of (Photosensitive Layer Forming Step (Part 1)) described in Example 1, (Photosensitive Layer Forming Step (Part 2)) described below was performed.

Photosensitive Layer Forming Step (Part 2))

The composition adjusted coating liquid 1 was applied to the undercoat layer of the support with the undercoat layer prepared in Example 1 to provide a coating layer 1 (corresponding to an antihalation layer). The amount of the polymer in the coating layer 1 was 0.65 g/m$^2$.

The silver halide-containing coating liquid 1 and the composition adjusted coating liquid 2 were applied to the coating layer 1 by simultaneous multilayer coating at a coating liquid flow ratio (silver halide-containing coating liquid 1/composition adjusted coating liquid 2) of 25/1 to form a silver halide-containing photosensitive layer on the support. The formed silver halide-containing photosensitive layer was set as a film A.

The amount of the gelatin in the layer formed by the composition adjusted coating liquid 2 was 0.10 g/m$^2$. In addition, in the layer formed by the silver halide-containing coating liquid 1, the amount of the silver was 6.2 g/m$^2$, the amount of the polymer was 0.22 g/m$^2$, and the amount of the gelatin was 1.0 g/m$^2$.

Example 3

A conductive film was obtained in the same manner as in Example 1 except that instead of (Photosensitive Layer Forming Step (Part 1)) described in Example 1, (Photosensitive Layer Forming Step (Part 3)) described below was performed.

(Photosensitive Layer Forming Step (Part 3))

The composition adjusted coating liquid 1 and the silver halide-containing coating liquid 1 were applied to the undercoat layer of the support with the undercoat layer prepared in Example 1 by simultaneous multilayer coating at a coating liquid flow ratio (silver halide-containing coating liquid 1/composition adjusted coating liquid 1) of 25/25 to form a silver halide-containing photosensitive layer on the support.

The amount (coating amount) of polymer in the layer formed by the composition adjusted coating liquid 1 was 0.65 g/m$^2$. In the layer formed by the silver halide-containing coating liquid 1, the amount of the silver was 6.2 g/m$^2$, the amount of the polymer was 0.22 g/m$^2$, and the amount of the gelatin was 1.0 g/m$^2$.

Further, the composition adjusted coating liquid 2 was applied to the silver halide-containing photosensitive layer to obtain a film A. The amount of the gelatin in the layer formed by the composition adjusted coating liquid 2 is 0.10 g/m$^2$.

Example 4

A conductive film was obtained in the same manner as in Example 1 except that instead of (Photosensitive Layer Forming Step (Part 1)) described in Example 1, (Photosensitive Layer Forming Step (Part 4)) described below was performed.

(Photosensitive Layer Forming Step (Part 4))

The composition adjusted coating liquid 1 and the silver halide-containing coating liquid 1 were applied to the undercoat layer of the support with the undercoat layer prepared in Example 1 by simultaneous multilayer coating at a coating liquid flow ratio (silver halide-containing coating liquid 1/composition adjusted coating liquid 1) of 25/25 to form a silver halide-containing photosensitive layer A on the support with the undercoat layer.

The amount (coating amount) of polymer in the layer formed by the composition adjusted coating liquid 1 was 0.65 g/m$^2$ and the amount (coating amount) of polymer in the layer formed by the silver halide-containing coating liquid 1 was 0.18 g/m$^2$. In the layer fondled by the silver halide-containing coating liquid 1, the amount of the silver was 5.0 g/m$^2$.

Further, a silver halide-containing coating liquid 2 separately prepared by adding polymer latex so as to have a mixing mass ratio of polymer/gelatin (mass ratio) of 1.2/1 in the step of preparing the silver halide-containing coating liquid 1 was applied to the silver halide-containing photosensitive layer A and the formed film was set to a film A. In the silver halide-containing coating liquid 2, the ratio R2 of the mass of the polymer with respect to the mass of the silver halide (polymer/silver halide) was 0.15. In the layer formed by the silver halide-containing coating liquid 2, the amount of the silver was 1.2 g/m$^2$ and the total amount of the gelatin of the film A was 1.0 g/m$^2$.

Example 5

A conductive film was obtained according to the same procedure as in Example 1 except that instead of the composition adjusted coating liquid 1, a composition adjusted coating liquid 2 containing colloidal silica (SNOW-TEC XL, manufactured by Nissan Chemical Industries, Ltd.) and gelatin at a mixing mass ratio (colloidal silica/gelatin) of 2/1 and containing water as a solvent and having undergone concentration adjustment such that the amount of the gelatin was 0.10 g/m$^2$ was used. In the obtained conductive film, the colloidal silica was included at the above-described upper end position UP and lower end position LP.

Example 6

A conductive film was obtained according to the same procedure as in Example 1 except that the amount of the polymer latex mixed in the composition adjusted coating liquid 1 was changed to a mixing mass ratio of polymer and gelatin (polymer/gelatin) of 6/1. The height from the surface X of the obtained conductive film (the surface on the side opposite to the support side) to the upper end position UP was 1.0 μm.

Example 7

A conductive film was obtained according to the same procedure as in Example 1 except that the amount of the polymer latex mixed in the composition adjusted coating liquid 1 was changed to a mixing mass ratio (polymer/gelatin) of 0.5/1. The height from the surface X of the obtained conductive film (the surface on the side opposite to the support side) to the upper end position UP was 0 μm.

Comparative Example 1

A conductive film was obtained according to the same procedure as in Example 1 except that instead of (Photosensitive Layer Forming Step (Part 1)) described in Example 1, (Photosensitive Layer Forming Step (Part 5)) described below was performed. In the following (Photosensitive Layer Forming Step (Part 5)), various coating liquids were separately applied without performing simultaneous multilayer coating.

(Photosensitive Layer Forming Step (Part 5))

The composition adjusted coating liquid 1 was applied to the undercoat layer of the support with the undercoat layer prepared in Example 1 to provide a coating layer 1. The amount of the polymer in the coating layer 1 was 0.65 g/m$^2$.

The silver halide-containing coating liquid 1 was applied to the coating layer 1 and thus a support in which a photosensitive layer 1 is formed was obtained. In the formed photosensitive layer 1, the amount of the silver was 6.2 g/m$^2$ and the amount of the gelatin was 1.0 g/m$^2$.

Further, the composition adjusted coating liquid 1 was applied to the photosensitive layer 1. The amount of the gelatin in the layer formed by the composition adjusted coating liquid 1 was 0.10 g/m$^2$.

Comparative Example 2

A conductive film was obtained according to the same procedure as in Example 1 except that (Gelatin Decomposition Treatment) was not performed.

Various Evaluations (Method of Calculating Metal Volume Ratio (Part 1))

The thin conductive wire of the conductive film (film D) obtained in each of the above Examples and Comparative Examples was cut by using a microtome in the above-described method (refer to FIG. 2B) and using a scanning electron microscope S-5500 mold manufactured by Hitachi High-Technologies Corporation (acceleration voltage: 2 kV, observation magnification: 30,000 times), the cut surface was observed to capture a sectional SEM image. In a case in which a contour line along the surface shape of the surface X of the thin conductive wire was moved from the surface X side of the thin conductive wire, which was on the side opposite to the support side, to the support side in the obtained vertical section image of the thin conductive wire, a position at which the contour line reached the metal portion included in the thin conductive wire was set to an upper end position and the area ratio of the metal portion (%) ({(area of metal portion)/(area of upper region)}×100)) in a region ranging from the upper end position to 100 nm toward the support side (upper region) was obtained. The measurement was performed at arbitrary 10 points and an arithmetical average value of the obtained values was calculated to obtain an average area ratio VA.

In a case of the calculation of the area ratio, the measurement was performed using an area fraction (area ratio) measuring function of image processing software Image J.

Next, in a case in which the contour line was moved from the upper end position to the support side, a position at which the thin conductive wire did not include the metal portion was set to a lower end position, and the area ratio of the metal portion (%) ({(area of metal portion)/(area of middle region)}×100)) in a region (middle region) ranging from a middle position between the upper end position and the lower end position to 50 nm toward the support side and to 50 nm toward the surface X side was obtained. The measurement was performed at arbitrary 10 points in which the average area ratio VA was obtained and an arithmetical average value of the obtained values was calculated to obtain an average area ratio VM1.

In addition, the area ratio of the metal portion (%) ({(area of metal portion)/(area of lower region)}×100)) in a region (lower region) ranging from the lower end position to 100 nm toward the surface X side was obtained. The measurement was performed at arbitrary 10 points in which the average area ratio VA was obtained and an arithmetical average value of the obtained values was calculated to obtain an average area ratio VB.

(Method of Calculating Metal Volume Ratio (Part 2))

The thin conductive wire of the conductive film (film D) obtained in each of the above Examples and Comparative Examples was cut by using a microtome in the above-described method (refer to FIG. 2B) and using a scanning electron microscope S-5500 mold manufactured by Hitachi High-Technologies Corporation (acceleration voltage: 2 kV, observation magnification: 30,000 times), the cut surface was observed to capture a sectional SEM image. In a case in which a contour line along the surface shape of the support was moved from the support side to the surface X of the thin conductive wire on the side opposite to the support to the support side in the obtained vertical section image of the thin conductive wire, a position at which the contour line reached the metal portion included in the thin conductive wire was set to a lower end position and the area ratio of the metal portion (%) ({(area of metal portion)/(area of lower region)}×100)) in a region ranging from the lower end position to 100 nm toward the surface X side (lower region) was obtained. The measurement was performed at arbitrary 10 points and an arithmetical average value of the obtained values was calculated to obtain an average area ratio VC.

In addition, in a case in which the contour line was moved from the lower end position to the surface X side, a position at which the thin conductive wire did not include the metal portion was set to an upper end position and the area ratio of the metal portion (%) ({(area of metal portion)/(area of middle region)}×100)) in a region (middle region) ranging from a middle position between the upper end position and the lower end position to 50 nm toward the support side and to 50 nm toward the surface X side was obtained. The measurement was performed at arbitrary 10 points in which the average area ratio VC was obtained and an arithmetical average value of the obtained values was calculated to obtain an average area ratio VM2.

(Resistance Evaluation)

Using a CONDUCTANCE MONITOR MODEL717B manufactured by DELCOM INSTRUMENTS, the surface resistance of the conductive film (film D) was measured and evaluated based on the following criteria. The expression "surface resistance is low" means that the volume resistivity is low.

A: A case in which the resistance value is less than 1.25 times the resistance value of Comparative Example 1 and there is no practical problem.

B: A case in which the resistance value is 1.25 times or more and less than 1.5 times the resistance value of Comparative Example 1 and there is limitation in use for application, such as a large touch panel of 20 inches or greater, which requires low resistance.

C: A case in which the resistance value is 1.5 times or more the resistance value of Comparative Example 1 and actual damage is generated.

(Scratch Resistance Evaluation)

A load of 10 g was applied to an OA Toraysee Blue KS2424-G102 (contact area: 2 cm×3 cm) manufactured by Toray Industries, Inc. and a straight sliding test was performed on the conductive film (film D) 10 times in reciprocating motion. The sample after the test was evaluated as follows from the viewpoint of resistance and wire visibility.

A: The rate of increase in electric resistance is less than 1.1 times and the rank of mesh visibility in mesh visibility evaluation of the front side, which will be described later, is not lowered.

B: The rate of increase in electric resistance is 1.1 times or more and less than 1.25 times or the rank of mesh visibility in mesh visibility evaluation of the front side, which will be described later, is lowered by one rank (A→B or B→C).

C: The rate of increase in electric resistance is 1.25 times or more or the rank of mesh visibility in mesh visibility evaluation of the front side, which will be described later, is lowered by two ranks (A→C).

(Mesh Visibility Evaluation (Front Side))

A transparent optical adhesive film (8146-2 manufactured by 3M Corporation) was laminated on the surface of the conductive film in which the thin conductive wire was provided obtained in each of the above Examples and Comparative Examples and super white glass was further laminated on one surface of the attached transparent optical adhesive film. In addition, a transparent optical adhesive film was laminated on the other surface of the conductive film and a polyethylene terephthalate (PET) film of 100 µm was further laminated on one surface of the attached transparent optical adhesive film. Thus, an evaluation sample in which a mesh pattern formed by the thin conductive wire was interposed between the super white glass and the PET film was prepared.

The evaluation sample obtained according to the above procedure was placed on a black paper surface such that the super white glass became the upper side, and under a fluorescent lamp or sunlight, a direction in which light was applied and a direction in which the pattern was observed were changed to evaluate difficulty of visibility of the pattern in a comprehensive way.

A: A case in which the mesh pattern is hardly visible and there is no practical problem.

B: A case in which the mesh pattern is clearly viewed depending on an angle under a strong light source (under sunlight) but is not viewed under a weak light source (under a fluorescent lamp), and there is no practical problem.

C: A case in which light reflection of the mesh pattern is remarkable and actual damage is generated or light reflection seems to be yellowish and actual damage is generated.

(Mesh Visibility Evaluation (Back Side))

In (Mesh Visibility Evaluation (Front Side)), an evaluation sample was obtained by exchanging the super white glass and the PET film. In the evaluation sample, the super white glass was provided on the surface of the thin conductive wire on the support side and the PET film was provided on the opposite side thereof.

The obtained evaluation sample was used and placed on a black paper surface such that the super white glass became the upper side, and under a fluorescent lamp or sunlight, a direction in which light was applied and a direction in which the pattern was observed were changed to evaluate difficulty of visibility of the pattern in a comprehensive way. The evaluation criteria are the same as in (Mesh Visibility Evaluation (Front Side)).

Based on the results of (Mesh Visibility Evaluation (Front Side)) and (Mesh Visibility Evaluation (Back Side)), comprehensive evaluation was performed according to the following criteria.

A: A case in which the results of both (Mesh Visibility Evaluation (Front Side)) and (Mesh Visibility Evaluation (Back Side)) were evaluated as A.

B: A case in which the result of at least one of (Mesh Visibility Evaluation (Front Side)) or (Mesh Visibility Evaluation (Back Side)) was evaluated as B or C.

C: A case in which the results of both (Mesh Visibility Evaluation (Front Side)) and (Mesh Visibility Evaluation (Back Side)) were evaluated as C.

In Table 1, the column "AH" means the composition adjusted coating liquid 1, the column "EM" means the silver halide-containing coating liquid (1 or 2), the column "Pc"

means the composition adjusted coating liquid 2, and the numerical value in each column indicates the application order.

For example, a case in which the numerical value of each of the columns "AH", "EM", and "Pc" is "1" in Example 1 means that three coating liquids are applied at the first application by simultaneous multilayer coating to form the conductive film.

film on the side opposite to the support side was 1% or more and less than 50%.

In the conductive film of each of Examples 1, and 3 to 7, the average area ratio of the metal portion in a region ranging from the lower end position LP described in the second embodiment to 400 nm toward the surface of the conductive film on the side opposite to the support side was 1% or more and less than 50%.

TABLE 1

| | Application order | | | Average area ratio | | | | | | | Evaluation | | | |
| | | | | | | | | | | | | Mesh visibility | | | |
| | AH | EM | Pc | VA | VM1 | VB | VC | VM2 | Resistance | Scratch resistance | Front side | Back side | Comprehensive evaluation | Remarks |
|---|---|---|---|---|---|---|---|---|---|---|---|---|---|---|
| Example 1 | 1 | 1 | 1 | 35% | 80% | 30% | 25% | 80% | A | A | A | A | A | — |
| Example 2 | 1 | 2 | 2 | 35% | 80% | 70% | 65% | 80% | A | A | A | C | B | — |
| Example 3 | 1 | 1 | 2 | 80% | 80% | 30% | 25% | 80% | A | A | C | A | B | — |
| Example 4 | 1 | 1.2 | — | 35% | 80% | 30% | 25% | 80% | A | B | A | A | A | — |
| Example 5 | 1 | 1 | 1 | 35% | 80% | 30% | 25% | 80% | A | A | A | A | A | Colloidal silica was used |
| Example 6 | 1 | 1 | 1 | 35% | 80% | 30% | 25% | 80% | B | A | A | A | A | Thickness from surface to upper end position was large |
| Example 7 | 1 | 1 | 1 | 45% | 80% | 30% | 25% | 80% | A | B | B | A | B | Thinckness from surface to upper end position was small |
| Comparative Example 1 | 1 | 2 | 3 | 70% | 80% | 70% | 65% | 80% | A | A | C | C | C | — |
| Comparative Example 2 | 1 | 1 | 1 | 20% | 35% | 30% | 25% | 35% | C | A | A | A | A | — |

For example, in Example 2, the numerical value of the column "AH" is "1", the numerical value of each of the columns "EM" and "Pc" is "2". This means that the composition adjusted coating liquid 1 is applied at the first application and then the silver halide-containing coating liquid and the composition adjusted coating liquid 2 are applied at the second application by simultaneous multilayer coating to form the conductive film.

The numerical values "1, 2" of the column "EM" in Example 4 means that the silver halide-containing coating liquid 1 is applied at the first application and then the silver halide-containing coating liquid 2 is applied at the second application.

The respective numerical values "1", "2", and "3" of the columns "AH", "EM", and "Pc" in Comparative Example 1 means that the composition adjusted coating liquid 1 is applied at the first application, the silver halide-containing coating liquid 1 is applied at the second application, and the composition adjusted coating liquid 2 is applied at the third application.

In the conductive film of each of Example 1 and 2 and 4 to 7, the average area ratio of the metal portion in a region ranging from the upper end position UP described in the first embodiment to 300 nm toward the support side was 1% or more and less than 50%.

In the conductive film of each of Examples 1, and 3 to 7, the average area ratio of the metal portion in a region ranging from the lower end position LP described in the first embodiment to 450 nm toward the surface of the conductive As shown in Table 1, the conductive film of the present invention exhibited excellent conductive characteristics and the thin conductive wire was hardly viewed.

In the table, as shown in Example 1, in a case in which both VA and VB were in predetermined ranges, both the front side and the back side of the evaluation sample were observed. The thin conductive wire was hardly viewed and the conductive film was more preferable.

As shown in Example 1, in a case in which the mesh visibility comprehensive evaluation was A, even in a case in which the conductive film was formed on both surfaces of the support, in any of a case in which the conductive film was viewed from the front surface side and a case in which the conductive film was observed from the back surface, the mesh pattern was hardly visible and a detection electrode for a touch panel could be formed on both surfaces of one support. Thus, the conductive film can be suitably used.

On the other hand, Comparative Examples 1 and 2 in which a predetermined average area ratio was not satisfied, the desired effect was not obtained.

EXPLANATION OF REFERENCES

10: conductive film
12: support
14A, 14B, 14C: thin conductive wire
16: polymer
18: metal portion
20: upper region
22: middle region
24: lower region 26: opening
28, 30: coating film coating film
32: silver halide

What is claimed is:

1. A conductive film comprising:
a support; and
a thin conductive wire that is arranged on the support and contains a binder and a metal portion,
wherein in a case in which a contour line along a surface shape of a surface X of the thin conductive wire is moved in a vertical section of the thin conductive wire from the surface X of the thin conductive wire, which is on a side opposite to the support side, to the support side, a position at which the contour line reaches the metal portion included in the thin conductive wire is set as an upper end position, and an average area ratio VA of the metal portion in a region ranging from the upper end position to 100 nm toward the support side is 1% or more and less than 50%, and
in a case in which the contour line is moved from the upper end position to the support side, a position at which the contour line reaches the thin conductive wire does not include the metal portion is set to a lower end position, and an average area ratio VM1 of the metal portion in a region ranging from a middle position between the upper end position and the lower end position to 50 nm toward the support side and to 50 nm toward the surface X side is 50% or more.

2. The conductive film according to claim 1,
wherein an average area ratio VB of the metal portion in a region ranging from the lower end position to 100 nm toward the surface X side is 1% or more and less than 50%.

3. The conductive film according to claim 2,
wherein the binder includes fine nonmetal particles and the fine nonmetal particles are present at least between the upper end position and the lower end position.

4. The conductive film according to claim 2,
wherein the metal portion contains at least one selected from the group consisting of gold, silver, copper, nickel, and palladium.

5. A method of producing the conductive film according to claim 2 in which the binder contains a polymer and the metal portion contains metal silver, the method comprising:
forming a silver halide-containing photosensitive layer by applying a silver halide-containing coating liquid containing silver halide, gelatin, and a first polymer different from the gelatin and a composition adjusted coating liquid containing a second polymer different from the gelatin to a support by simultaneous multilayer coating;
forming a conductive portion containing metal silver by exposing the silver halide-containing photosensitive layer and then performing a development treatment on the silver halide-containing photosensitive layer; and
obtaining the conductive film by removing the gelatin in the conductive portion.

6. A method of producing the conductive film according to claim 2 in which the binder contains a polymer and the metal portion contains metal silver, the method comprising:
forming a silver halide-containing photosensitive layer 1 by applying a silver halide-containing coating liquid 1 containing silver halide, gelatin, and a first polymer different from the gelatin to a support;
forming a multilayer film containing the silver halide-containing photosensitive layer 1 and a silver halide-containing photosensitive layer 2 by applying a silver halide-containing coating liquid 2 containing silver halide, gelatin, and a second polymer different from the gelatin to the silver halide-containing photosensitive layer 1 to form the silver halide-containing photosensitive layer 2;
forming a conductive portion containing metal silver by exposing the multilayer film and then performing a development treatment on the multilayer film; and
obtaining the conductive film by removing the gelatin in the conductive portion,
wherein a ratio R2 of a mass Y2 of the second polymer with respect to a mass Z2 of the silver halide in the silver halide-containing coating liquid 2 is larger than a ratio R1 of a mass Y1 of the first polymer with respect to a mass Z1 of the silver halide in the silver halide-containing coating liquid 1.

7. A touch panel comprising:
the conductive film according to claim 2.

8. The conductive film according to claim 1,
wherein the binder includes fine nonmetal particles and the fine nonmetal particles are present at least between the upper end position and the lower end position.

9. The conductive film according to claim 8,
wherein the metal portion contains at least one selected from the group consisting of gold, silver, copper, nickel, and palladium.

10. A method of producing the conductive film according to claim 8 in which the binder contains a polymer and the metal portion contains metal silver, the method comprising:
forming a silver halide-containing photosensitive layer by applying a silver halide-containing coating liquid containing silver halide, gelatin, and a first polymer different from the gelatin and a composition adjusted coating liquid containing a second polymer different from the gelatin to a support by simultaneous multilayer coating;
forming a conductive portion containing metal silver by exposing the silver halide-containing photosensitive layer and then performing a development treatment on the silver halide-containing photosensitive layer; and
obtaining the conductive film by removing the gelatin in the conductive portion.

11. A method of producing the conductive film according to claim 8 in which the binder contains a polymer and the metal portion contains metal silver, the method comprising:
forming a silver halide-containing photosensitive layer by applying a silver halide-containing coating liquid containing silver halide, gelatin, and a first polymer different from the gelatin and a composition adjusted coating liquid containing fine nonmetal particles to a support by simultaneous multilayer coating;
forming a conductive portion containing metal silver by exposing the silver halide-containing photosensitive layer and then performing a development treatment on the silver halide-containing photosensitive layer; and
obtaining the conductive film by removing the gelatin in the conductive portion.

12. The conductive film according to claim 1,
wherein the metal portion contains at least one selected from the group consisting of gold, silver, copper, nickel, and palladium.

13. A method of producing the conductive film according to claim 1 in which the binder contains a polymer and the metal portion contains metal silver, the method comprising:
forming a silver halide-containing photosensitive layer by applying a silver halide-containing coating liquid containing silver halide, gelatin, and a first polymer different from the gelatin and a composition adjusted coating liquid containing a second polymer different from the gelatin to a support by simultaneous multilayer coating;

forming a conductive portion containing metal silver by exposing the silver halide-containing photosensitive layer and then performing a development treatment on the silver halide-containing photosensitive layer; and obtaining the conductive film by removing the gelatin in the conductive portion.

14. A method of producing the conductive film according to claim 1 in which the binder contains a polymer and the metal portion contains metal silver, the method comprising:

forming a silver halide-containing photosensitive layer 1 by applying a silver halide-containing coating liquid 1 containing silver halide, gelatin, and a first polymer different from the gelatin to a support;

forming a multilayer film containing the silver halide-containing photosensitive layer 1 and a silver halide-containing photosensitive layer 2 by applying a silver halide-containing coating liquid 2 containing silver halide, gelatin, and a second polymer different from the gelatin to the silver halide-containing photosensitive layer 1 to form the silver halide-containing photosensitive layer 2;

forming a conductive portion containing metal silver by exposing the multilayer film and then performing a development treatment on the multilayer film; and obtaining the conductive film by removing the gelatin in the conductive portion, wherein a ratio R2 of a mass Y2 of the second polymer with respect to a mass Z2 of the silver halide in the silver halide-containing coating liquid 2 is larger than a ratio R1 of a mass Y1 of the first polymer with respect to a mass Z1 of the silver halide in the silver halide-containing coating liquid 1.

15. A touch panel comprising:
the conductive film according to claim 1.

16. A conductive film comprising:
a support; and
a thin conductive wire that is arranged on the support and contains a binder and a metal portion,
wherein in a case in which a contour line along a surface shape of a surface X of the thin conductive wire is moved in a vertical section of the thin conductive wire from the support side to the surface X of the thin conductive wire on a side opposite to the support side, a position at which the contour line reaches the metal portion included in the thin conductive wire is set as a lower end position, and an average area ratio VC of the metal portion in a region ranging from the lower end position to 100 nm toward the surface X side is 1% or more and less than 50%, and in a case in which the contour line is moved from the lower end position to the surface X side, a position at which the contour line reaches the thin conductive wire does not include the metal portion is set to an upper end position, and an average area ratio VM2 of the metal portion in a region ranging from a middle position between the upper end position and the lower end position to 50 nm toward the support side and to 50 nm toward the surface X side is 50% or more.

17. The conductive film according to claim 16,
wherein the binder includes fine nonmetal particles and the fine nonmetal particles are present at least between the upper end position and the lower end position.

18. The conductive film according to claim 16,
wherein the metal portion contains at least one selected from the group consisting of gold, silver, copper, nickel, and palladium.

19. A method of producing the conductive film according to claim 16 in which the binder contains a polymer and the metal portion contains metal silver, the method comprising:

forming a silver halide-containing photosensitive layer by applying a silver halide-containing coating liquid containing silver halide, gelatin, and a first polymer different from the gelatin and a composition adjusted coating liquid containing a second polymer different from the gelatin to a support by simultaneous multilayer coating;

forming a conductive portion containing metal silver by exposing the silver halide-containing photosensitive layer and then performing a development treatment on the silver halide-containing photosensitive layer; and obtaining the conductive film by removing the gelatin in the conductive portion.

20. A touch panel comprising:
the conductive film according to claim 16.

* * * * *